Figure 15:
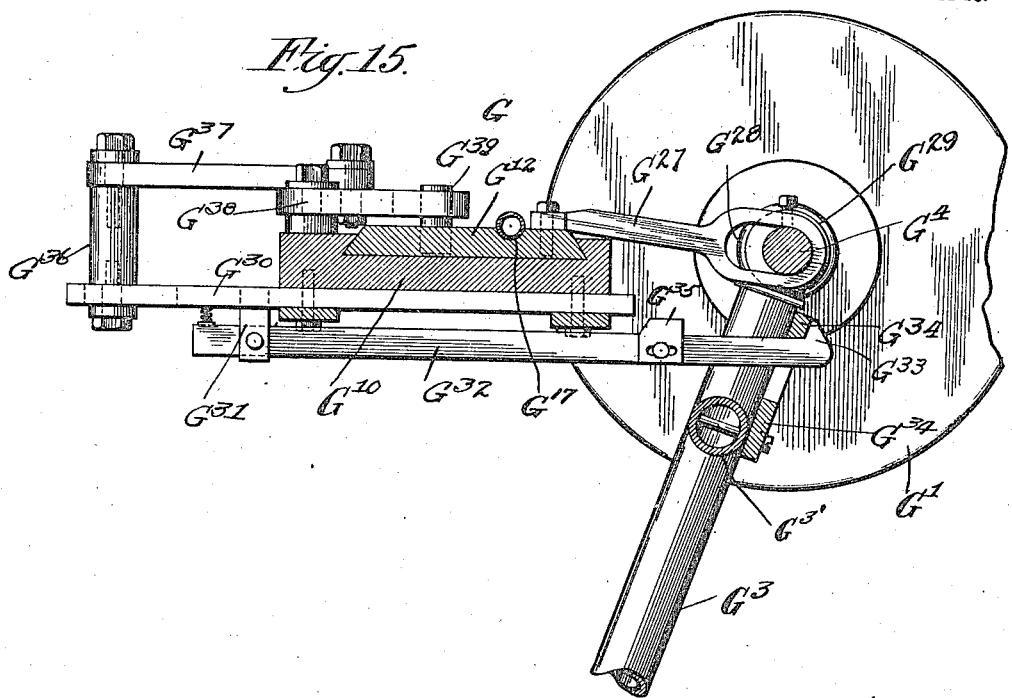

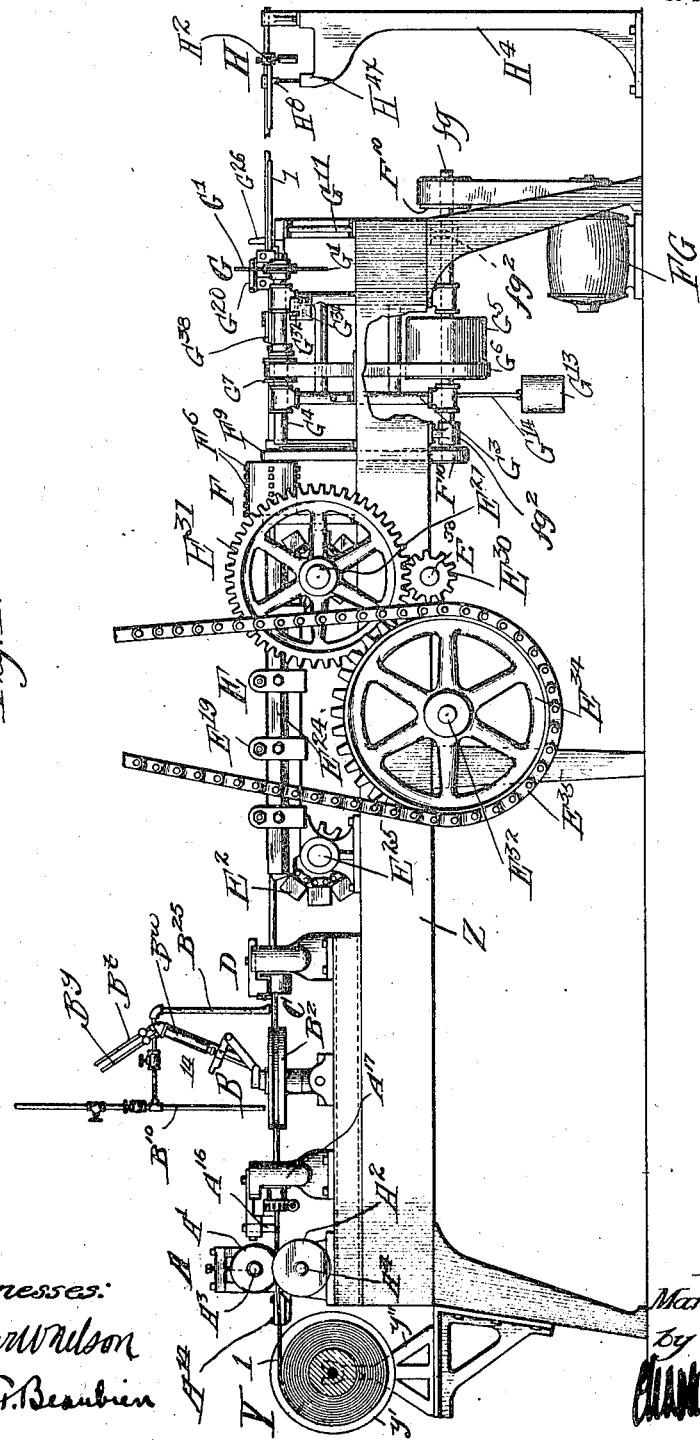

M. B. LLOYD.
CONTINUOUS TUBE MILL.
APPLICATION FILED JULY 12, 1911.
1,027,865.
Patented May 28, 1912.
15 SHEETS—SHEET 2.
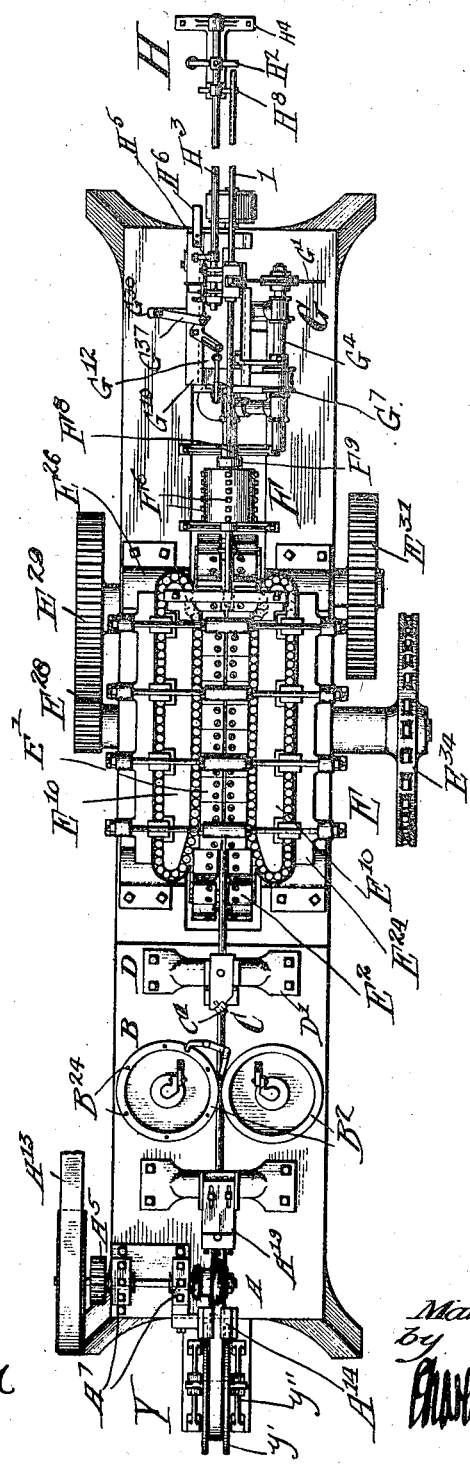
Witnesses:
Arthur W Nelson
Edgar F. Beaubien
Inventor:
Marshall B. Lloyd
by
Atty

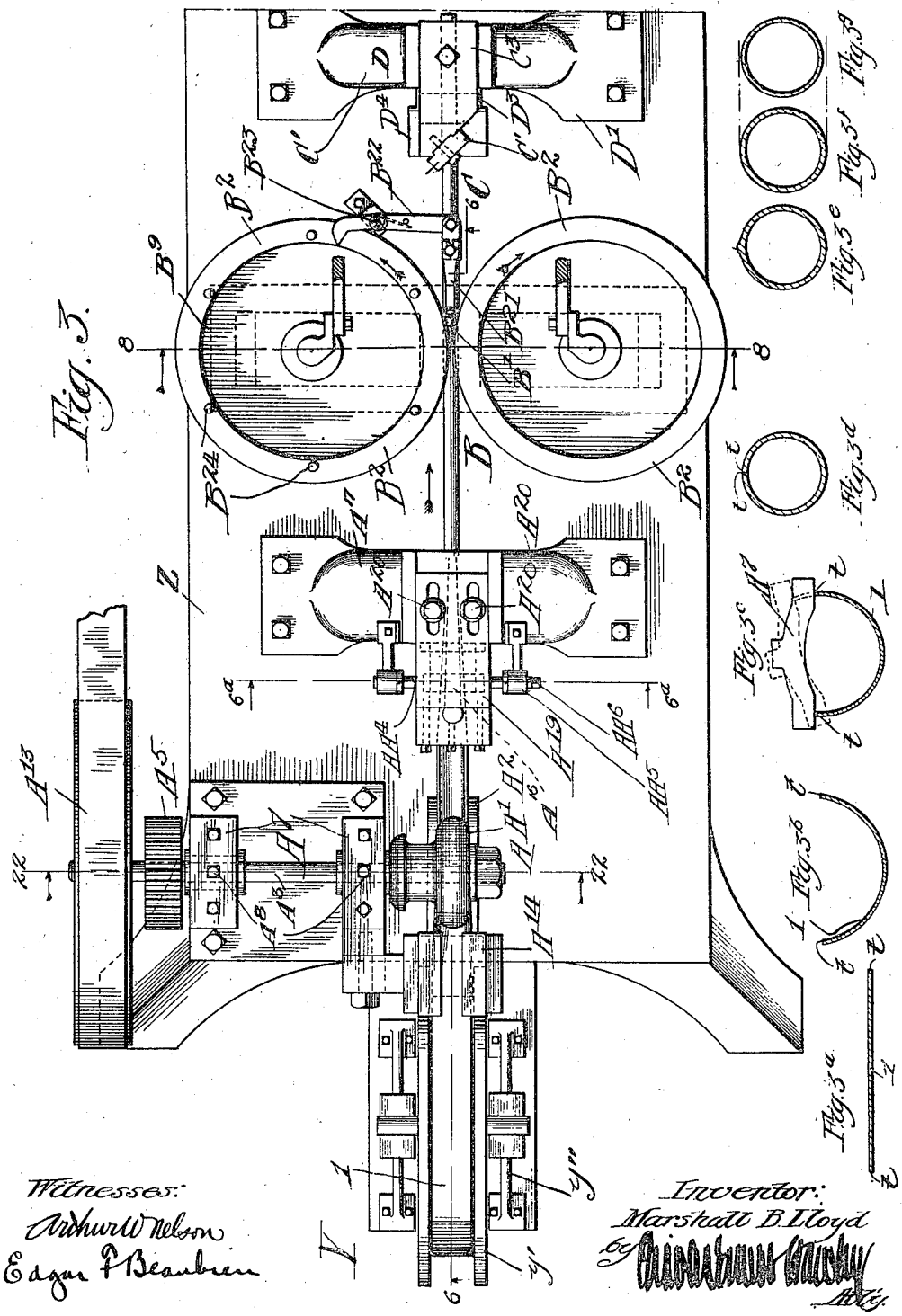

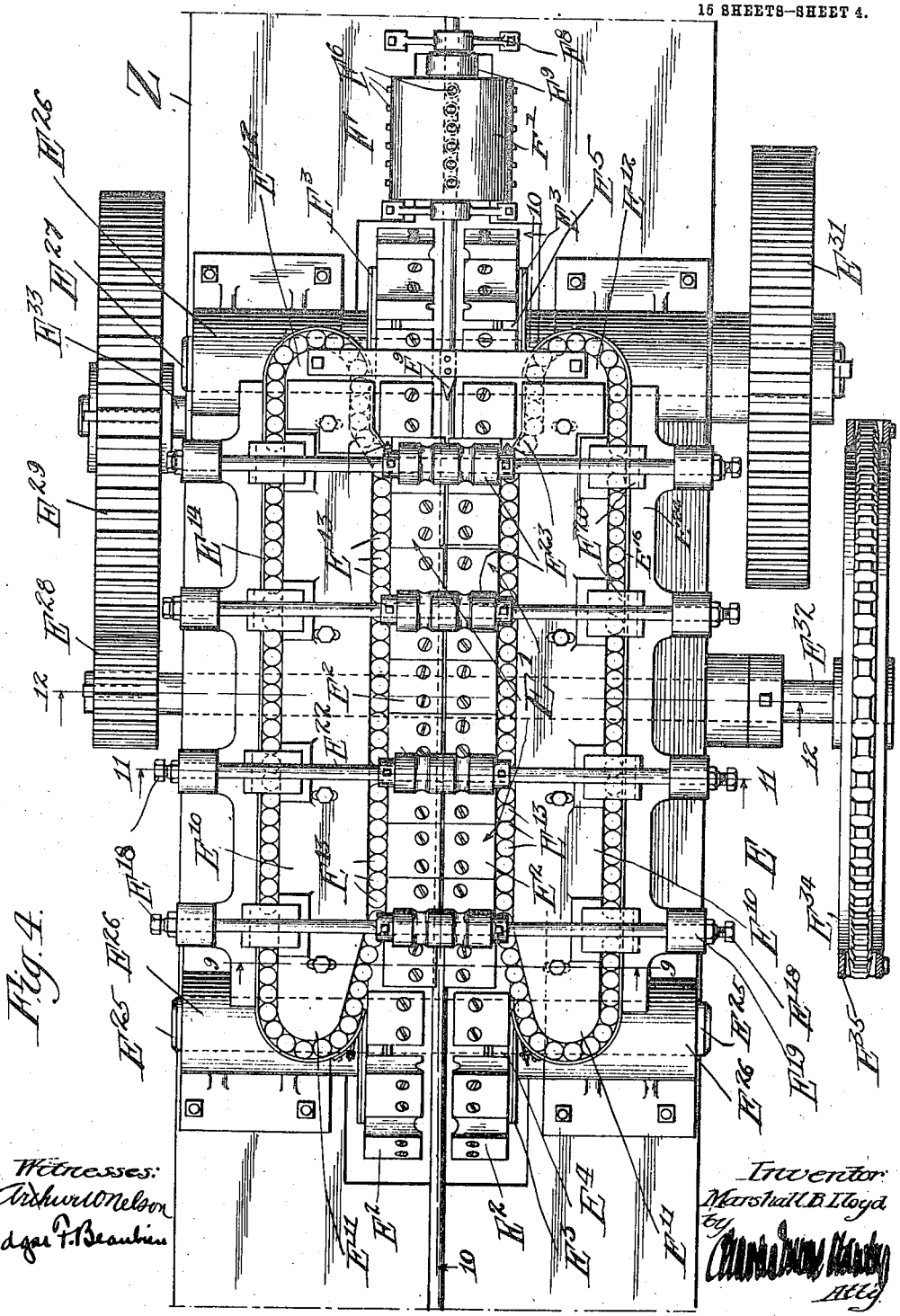

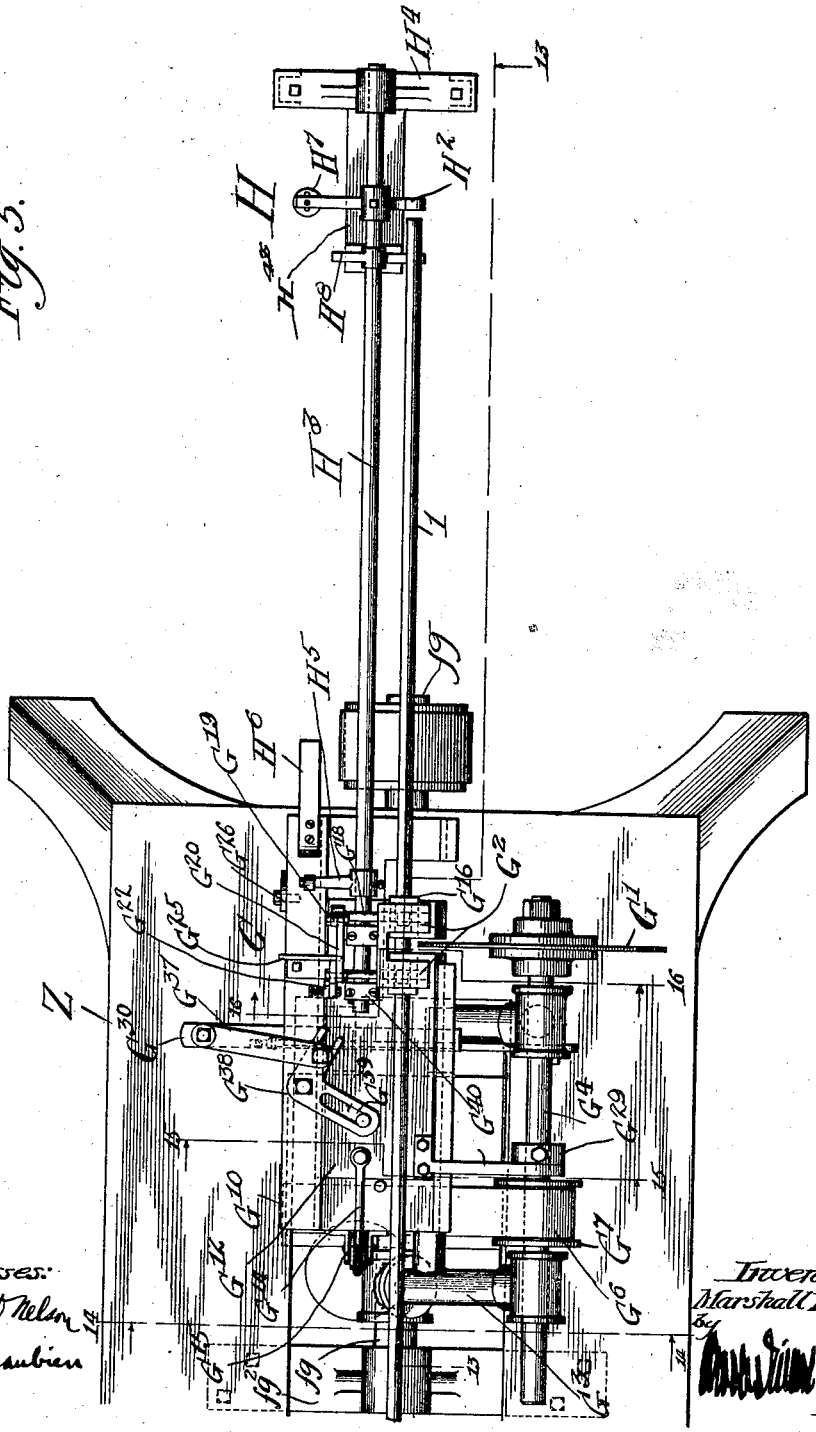

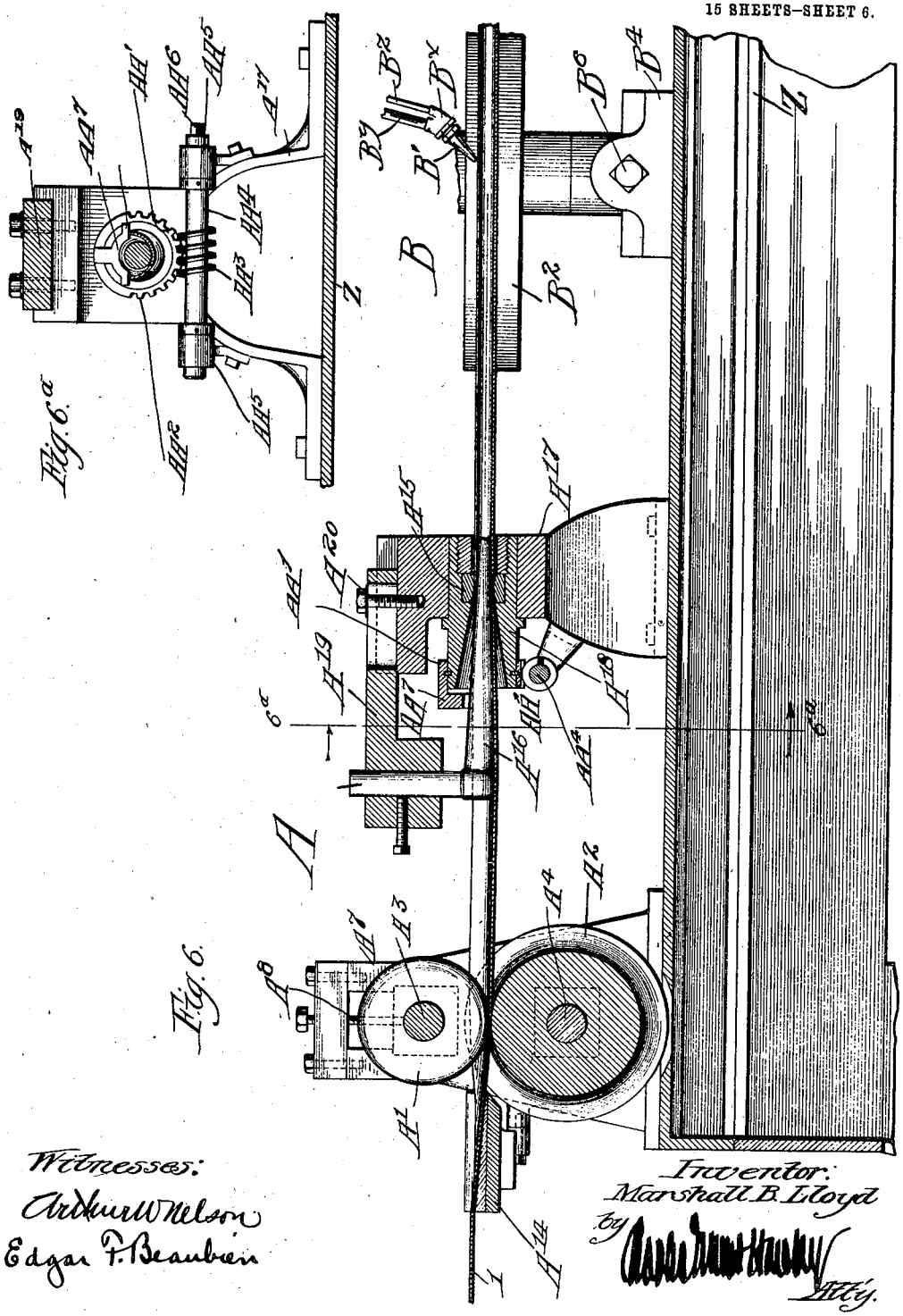

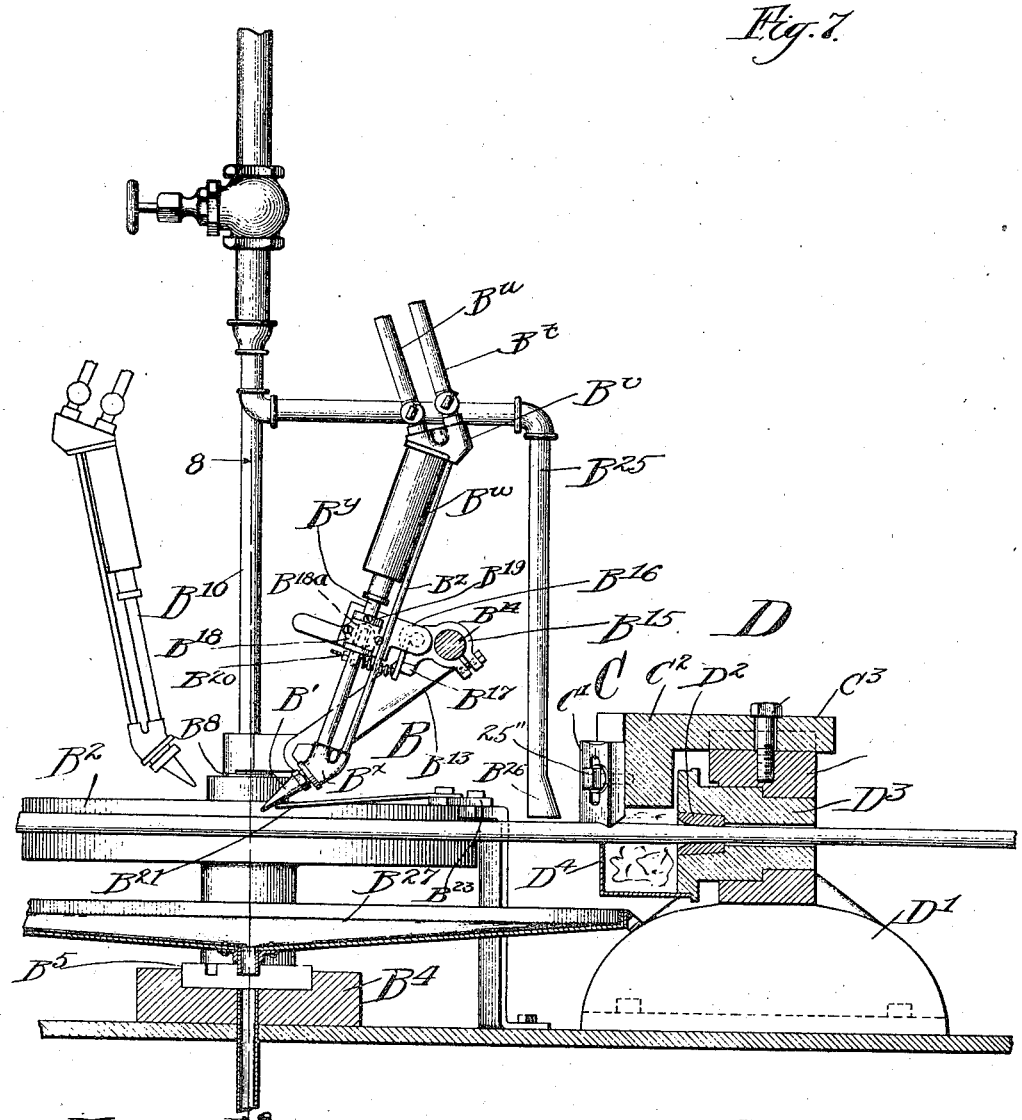

M. B. LLOYD.
CONTINUOUS TUBE MILL.
APPLICATION FILED JULY 12, 1911.
1,027,865.
Patented May 28, 1912.
15 SHEETS—SHEET 8.
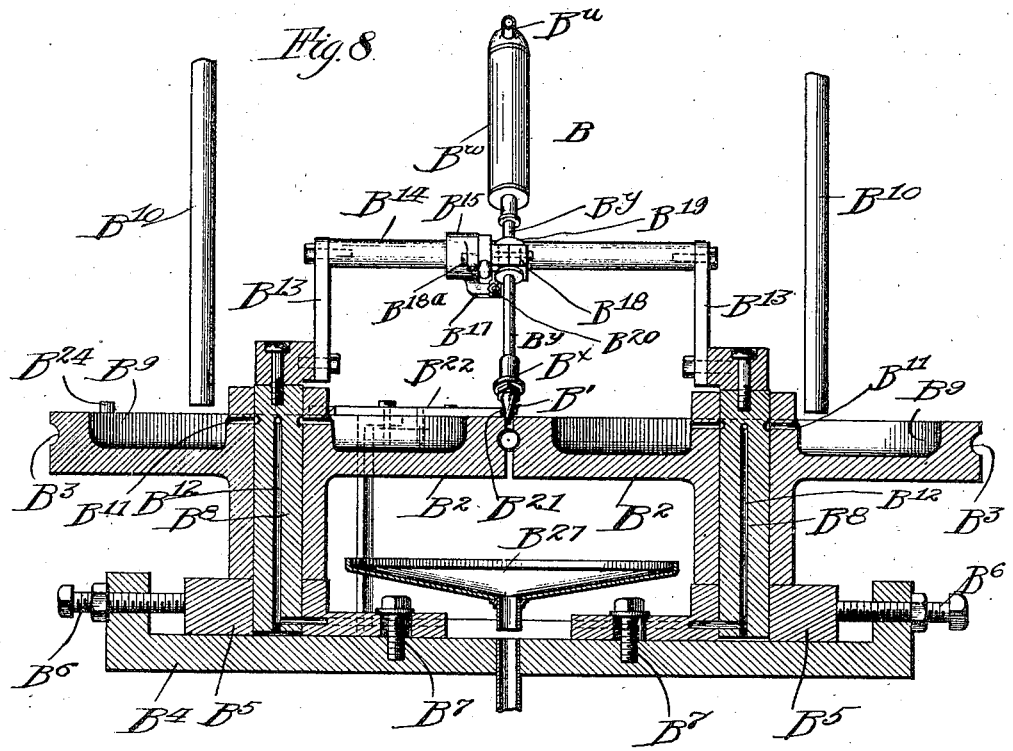
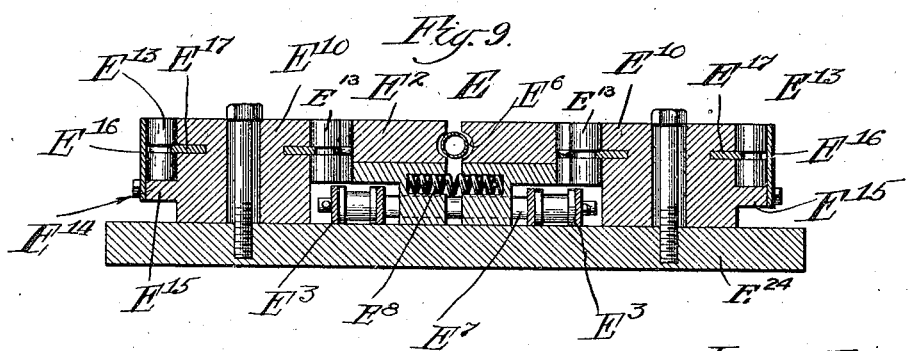
Witnesses:
Inventor:
Marshall B. Lloyd

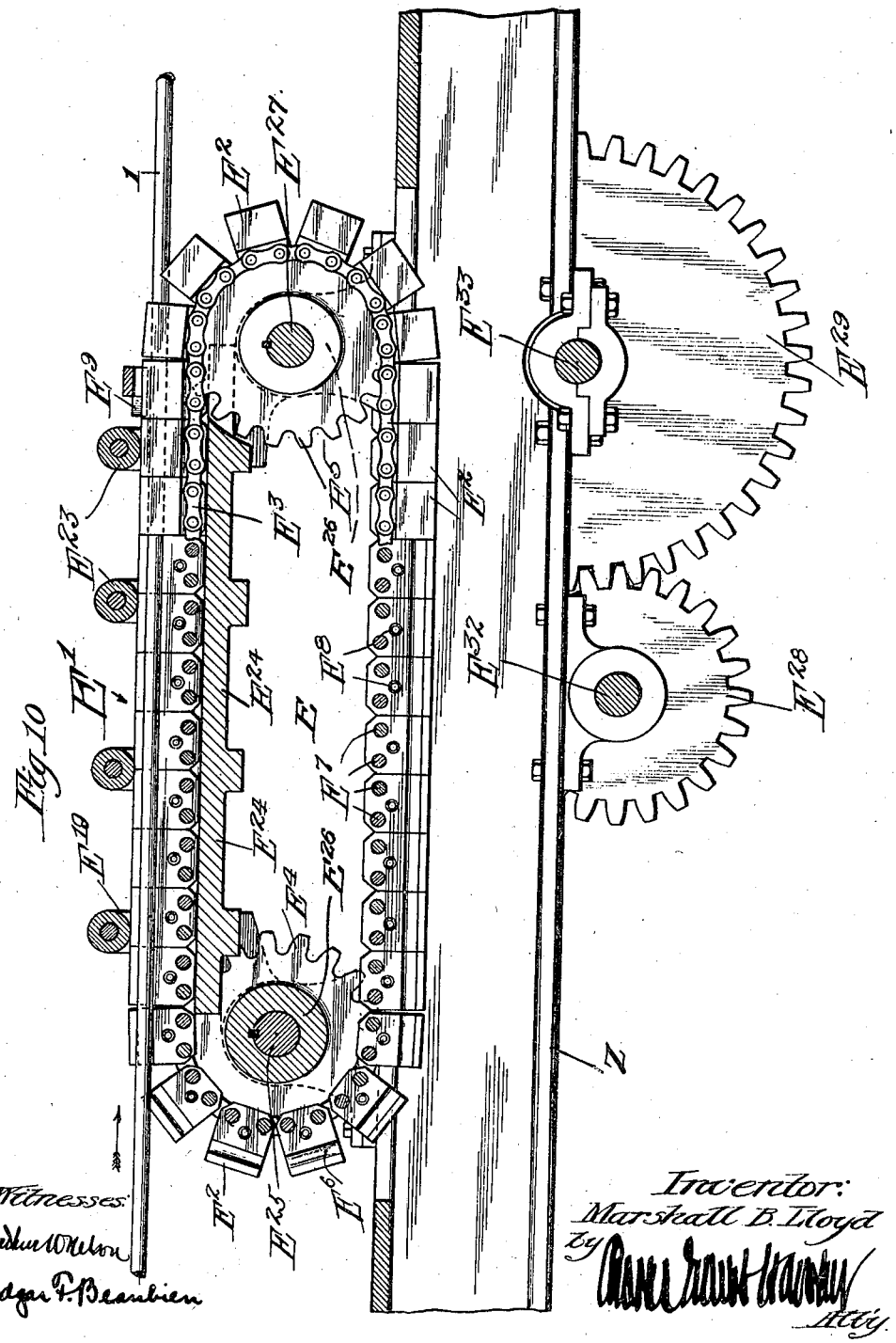

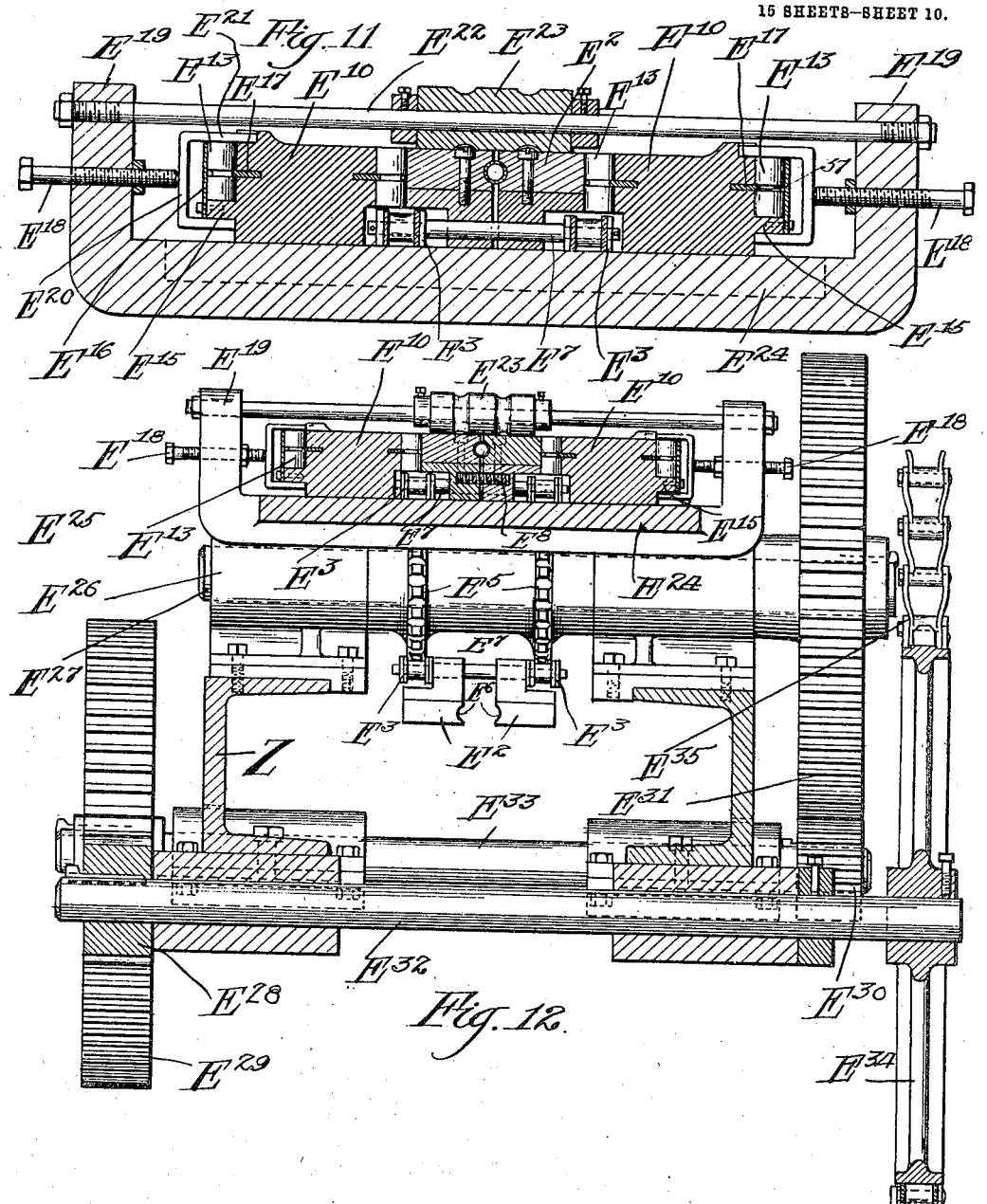

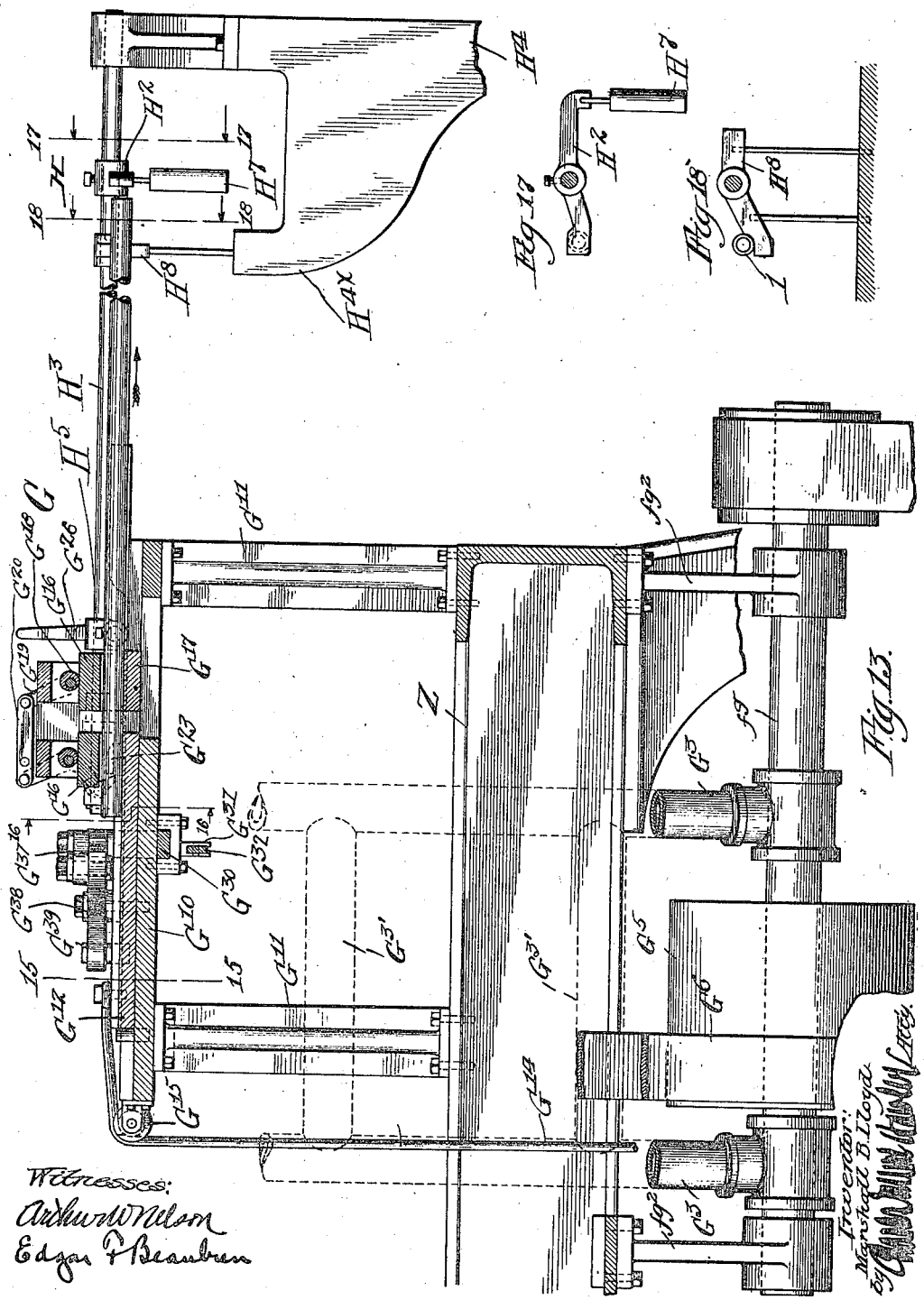

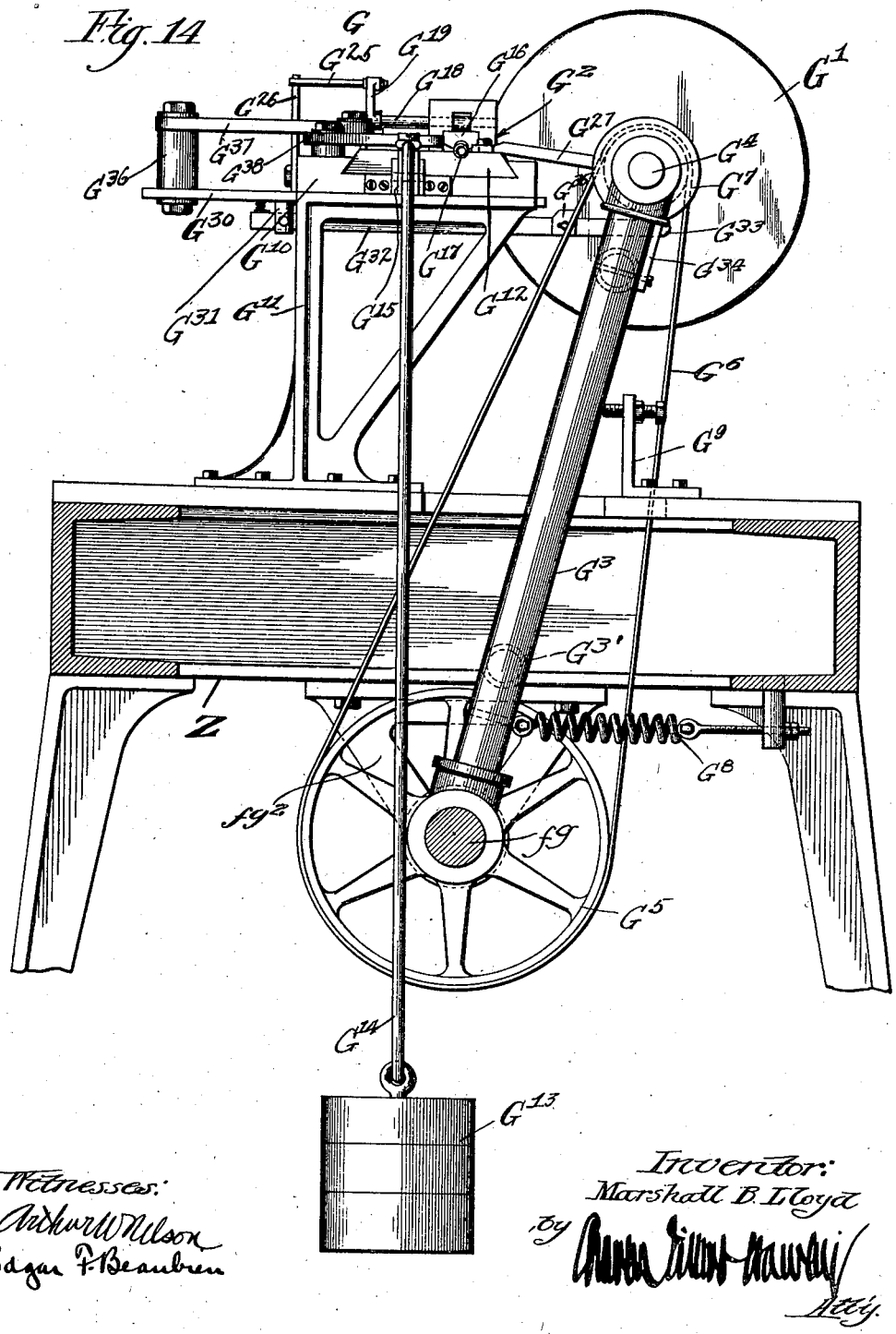

M. B. LLOYD.
CONTINUOUS TUBE MILL.
APPLICATION FILED JULY 12, 1911.

1,027,865.

Patented May 28, 1912.

15 SHEETS—SHEET 13.

Witnesses:

Inventor:
Marshall B. Lloyd

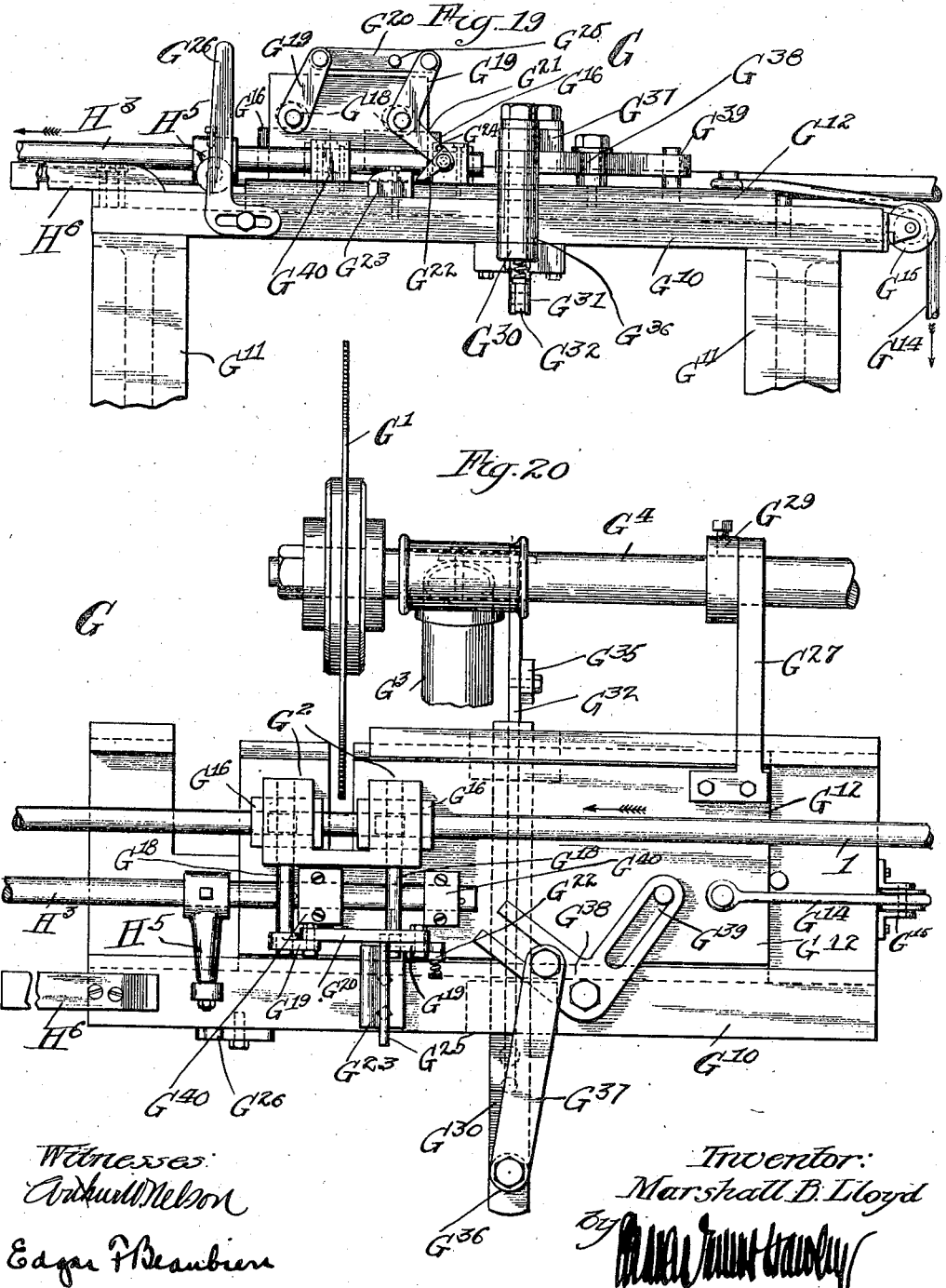

M. B. LLOYD.
CONTINUOUS TUBE MILL.
APPLICATION FILED JULY 12, 1911.
1,027,865.
Patented May 28, 1912.
15 SHEETS—SHEET 15.
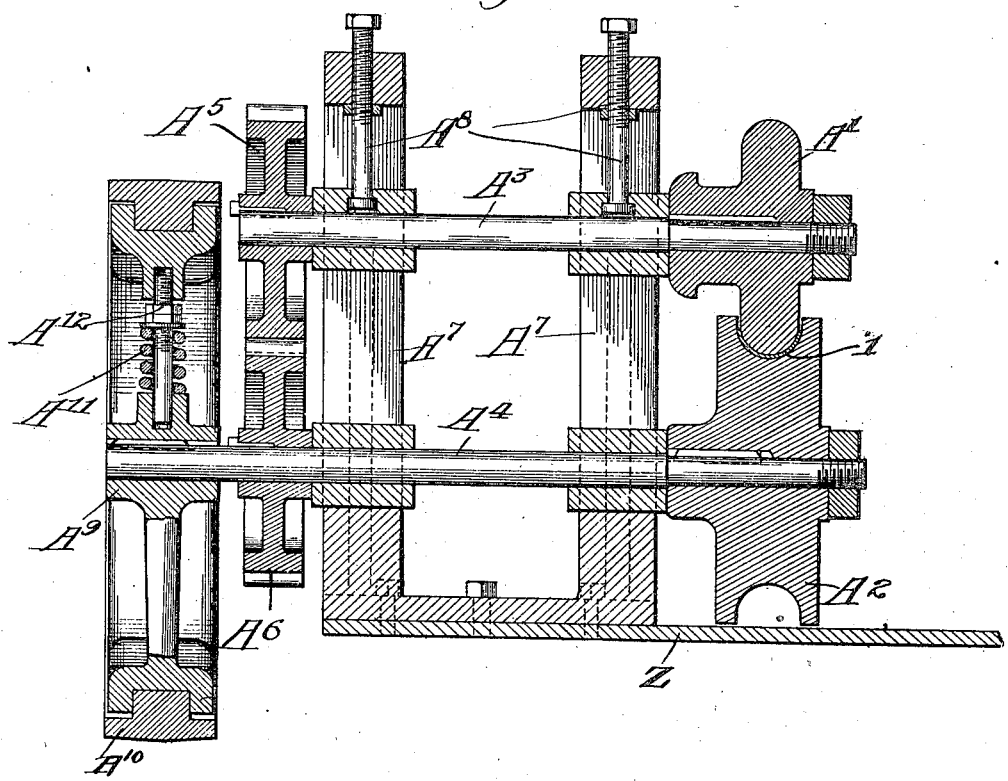
Fig. 21.
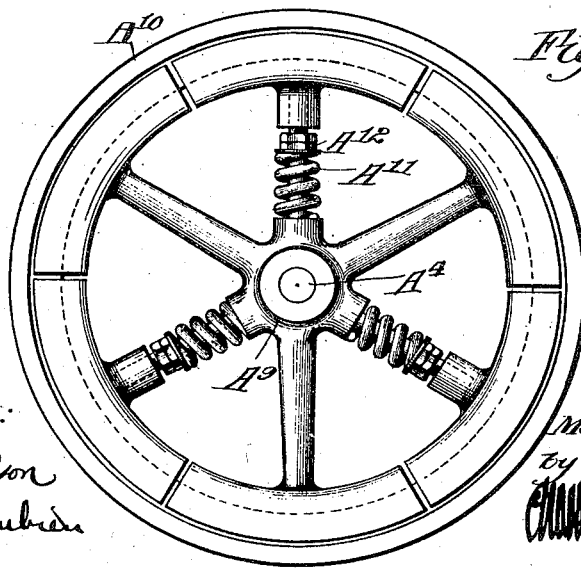
Fig. 22.
Witnesses:
Arthur W. Nelson
Edgar F. Beaubien
Inventor:
Marshall B. Lloyd
by
Atty.

UNITED STATES PATENT OFFICE.

MARSHALL B. LLOYD, OF MENOMINEE, MICHIGAN, ASSIGNOR TO AUTOMATIC WELDING COMPANY, OF MENOMINEE, MICHIGAN, A CORPORATION OF MICHIGAN.

CONTINUOUS TUBE-MILL.

1,027,865. Specification of Letters Patent. Patented May 28, 1912.

Application filed July 12, 1911. Serial No. 638,203.

*To all whom it may concern:*

Be it known that I, MARSHALL BURNS LLOYD, a citizen of the United States, and a resident of Menominee, Menominee county, Michigan, have invented certain new and useful Improvements in Machines for Manufacturing Metal Tubes, of which the following a specification.

My invention relates generally to machines for manufacturing metal tubing, and has particular reference to an improved machine for manufacturing welded metal tubing.

The object of my invention is to provide a machine which shall be adapted to produce metal tubing, and particularly thin-walled metal tubing, more rapidly, more perfectly, more economically and with much less manual labor than has been possible hitherto.

Another object of my invention is to provide a machine by means of which either non-welded or welded metal tubing may be thus produced continuously and in any desired lengths.

A special object of my invention is to provide a continuous tube mill of such construction that metal tubing may be formed from strip stock, welded, shaped, and cut up in lengths, without manual handling or intervention, and within a minimum of time and space.

A further and particular object of this invention is to provide an automatic machine or apparatus for carrying out the improvements in the art of manufacturing welded metal tubing which are described and claimed in my companion application of even date herewith, Serial No. 638,202, entitled Continuous process of manufacturing metal tubing.

Still further objects of my invention will appear hereinafter.

My novel automatic or continuous tube mill comprises a plurality of mechanisms and organizations of mechanisms by which the material—usually either cold rolled or hot rolled strip steel—is formed into a tube having a longitudinal seam and is then welded, smoothed, sized, straightened and cut off to length—all in one continuous operation.

My invention also embraces means for positioning the seam of the tube in readiness for welding, for cooling the tube after it is welded, and for accomplishing an important step of the process above referred to, which consists in moving the material forward at a constant speed.

More specifically defined, my invention resides in a machine which in its preferred form, comprises formers or shapers operating in conjunction with an automatic traveling vise or draft mechanism to form or shape the metal into longitudinally seamed tubing, and having correlated and coacting parts and mechanisms for heating and welding the edges of the tube to close the seam thereof as rapidly as the tubing is drawn forward, and for controlling the relation of the welding mechanism and the tubing so that the seam of the latter will be positioned or guided in proper alinement with the welding device to accurately form the welded seam.

My invention contemplates, though it is not so limited, a machine whereby the welding of the edges of the tubing is brought about by the aid of pressure accompanying the heating of the metal.

My invention also consists in a machine which automatically removes the bur usually formed at the seam by the welding operation and also other imperfections in the surface of the tubing, and which perfects the shape and size of the tubing preparatory to its being cut into lengths and discharged from the machine.

My invention further comprises a mechanism which automatically measures and cuts the tubing into lengths, without interruption in the movement of the tubing or in the operation of the machine.

An important feature of my invention resides in a traveling vise or gripping mechanism which automatically propels or feeds the strip metal and the tubing formed therefrom to the various operating parts by which the several stages in the development of the finished tubing are accomplished; which automatically maintains the tubing in motion while the operating parts of the machine properly perform their functions; which automatically straightens or longitudinally shapes the tubing, and which in conjunction with automatic cut-off mechanism determines or measures the lengths into which the tubing is finally cut by said cut-off mechanism.

My invention further resides in a machine which has all of its operating parts and mechanisms combined and arranged in compact form and all coöperating to produce finished metallic tubing at a maximum rate of speed, the various operating parts, however, being removable and adjustable so that the machine as a whole possesses the widest possible range of adaptability to the production of tubing of various shapes and sizes.

My invention also consists in several primary and secondary combinations of parts co-acting to produce various results, all as hereinafter described and particularly pointed out in the appended claims.

Figure 16:
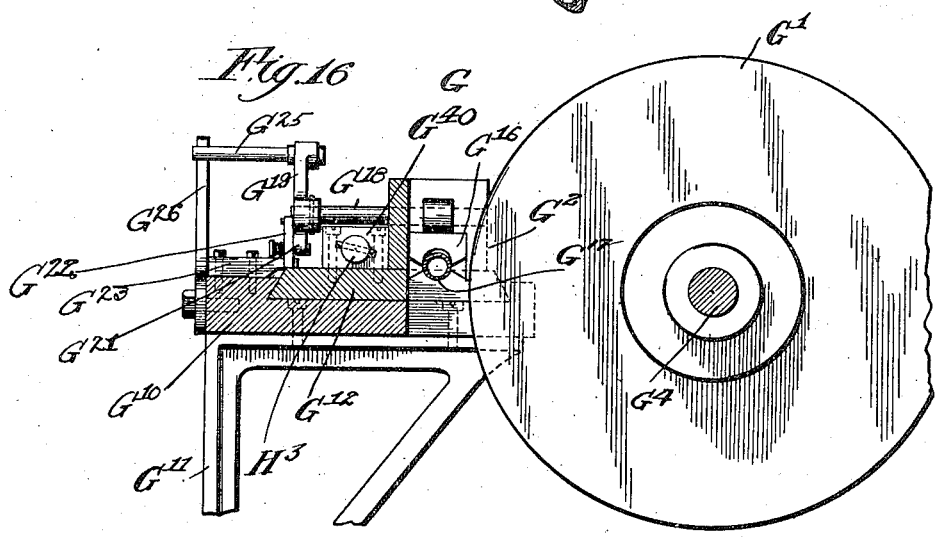

My invention will be more readily understood by reference to the accompanying drawings, forming part of this specification, and in which:

Figure 1, is a side elevation of a continuous tube mill embodying my invention; Fig. 2, is a plan view thereof; Figs. 3, 4 and 5, together constitute an enlarged plan view of the machine; Figs. 3$^a$, 3$^b$, 3$^c$, 3$^d$, 3$^e$, 3$^f$, and 3$^g$, are cross-sectional views, illustrating the evolution or development of the tube, from the raw stock or strip to the finished tube section; Fig. 6, is an enlarged vertical, longitudinal section, taken centrally through the tube-forming mechanism; Fig. 6$^a$, is a vertical section on the line 6$^a$—6$^a$ of Figs. 3 and 6; Fig. 7, is an enlarged vertical, longitudinal section of the welding mechanism, the bur-removing mechanism and the tube-reducing mechanism, the section being in the same plane as Fig. 6; Fig. 8, is a vertical cross section on the line 8—8 of Figs. 3 and 7; Fig. 9, is an enlarged transverse section of the traveling or continuous vise, on the line 9—9 of Fig. 4; Fig. 10, is a longitudinal, vertical section of the continuous vise, on the line 10—10 of Fig. 4; Fig. 11, is an enlarged sectional view similar to Fig. 9, but taken on the line 11—11 of Fig. 4; Fig. 12, is a transverse section of the continuous vise and the operating mechanism thereof, on the line 12—12 of Fig. 4; Fig. 13, is a vertical, longitudinal section on the line 13—13 of Fig. 5, enlarged, showing details of the measuring and cut-off mechanisms; Fig. 14, is an enlarged transverse vertical section, on the line 14—14 of Fig. 5; Fig. 15, is a still further enlarged sectional detail of the cut-off mechanism, the section being taken on the line 15—15 of Fig. 13; Fig. 16 is a similar view on the line 16—16 of Fig. 13; Fig. 17, is an end view of the adjustable gage of the cut-off mechanism, on line 17—17 of Fig. 13; Fig. 18 is a like end view of the tube supporting arm adjacent to the gage, as seen from the line 18—18 of Fig. 13; Fig. 19, is a side view of the cut-off mechanism, disclosing the parts which operate the tube clamps; Fig. 20, is an enlarged plan view of the parts shown in Fig. 19; Fig. 21, is an enlarged transverse vertical section of the tube forming dies or mechanism, on the line 22—22 of Fig. 3; and Fig. 22 is an enlarged side view of the frictional driving pulley disclosed in Figs. 3 and 21.

As intimated above the apparatus or mechanism herein illustrated is a continuous tube mill that I have devised for carrying out the improvements in the art of manufacturing welded metal tubing, fully described in my said companion application. This particular machine operates in conformity with that process or improvement in the art, the several organized mechanisms, individually and collectively performing the successive steps which I find are requisite to the rapid and economical production of finished tubing from strip stock. This present invention is in no wise limited to the precise machine herein illustrated, for it may readily be modified by one who is skilled in the art, without departing from the scope of the invention as set forth in the appended claims. It should also be understood that the several component mechanisms of the machine herein disclosed may be employed separately and also conjointly in different sets or series to produce different effects and results upon the material operated upon. Thus, for example, the mechanism used for forcibly and continuously drawing strip metal through tube-forming, or through tube-shaping dies of various kinds, may be utilized alone for that purpose, or for other purposes; and likewise, those mechanisms which co-act to feed a formed tube forward at a constant speed and apply heat at constant welding temperature to the closed or abutting edges of the tube, may be used to that end alone. So also other of the mechanism may be used to perform tube making or finishing functions in association with suitable co-acting mechanisms. It should also be understood that my improvements are applicable in and greatly simplify those processes of manufacturing tubing which are characterized by the addition of metal with which to close the seam of the tube; as for example, the process of manufacturing brazed tubing, as distinguished from the autogenous welding herein described.

In the drawings, Z, represents a strong table or bench, which supports the several operating parts of the machine. At one end of this bench is a tube-forming mechanism A. Next to the tube-forming mechanism is a welding mechanism B, and then follows a bur-removing mechanism C, a tube-reducing or sizing mechanism D, a continuous draft mechanism or vise E, a polishing mechanism F, and a cut-off mechanism G. At a convenient distance from the cut-off mechanism is a suitably supported measuring or gage mechanism H, connected with the cut-off mechanism in the manner hereinafter described.

Y, represents a reel or bundle of strip material to be made into tubing, the same being positioned to deliver the stock to the forming mechanism A. The reel proper, $y^1$, on which the material is wound, is rotatively mounted on a reel standard $y^{11}$, which standard may be attached to that end of the bench which bears the forming mechanism, A; or the standard may be placed on the floor near the end of the bench.

The working parts and faces of the several mechanisms on the bench are preferably arranged in longitudinal working alinement, and any given piece or length of tubing material which occupies the machine, considered from end to end thereof, is therefore maintained in straight line, non-distorted condition, while it (such piece or length) is being acted upon by the several mechanisms, A, B, C, D, E, F and G.

The construction of the forming mechanism is disclosed in Figs. 1, 2, 3, 6, 21 and 22. As indicated therein, the strip may be formed into a tube by using two sets of forming dies. The first set may comprise one or more pairs of rotary dies or rolls; for example, the upper and lower rolls $A^1$ and $A^2$ are of such formation as to shape the strip to semi-circular form in cross section. These rolls are mounted on shafts $A^3$ and $A^4$, which are positively connected by spur gears $A^5$ and $A^6$ of the same ratio as the rolls $A^1$, $A^2$. The bearings of the shafts $A^3$ and $A^4$ are held in a pair of standards $A^7$ which rise from the bench, and the shaft $A^3$ is vertically adjustable by means of the screws $A^8$. As it will appear hereinafter, the material is forcibly pulled or drawn through the several operating mechanisms by the continuous vise E. In some cases I prefer to relieve the drawing vise from all or a part of the resistance of the forming mechanism; and, in such cases, I equip the forming rolls with an independent driving mechanism. This may be the friction pulley shown in Figs. 2, 3, 21 and 22; made up of a hub or internal portion $A^9$, having sections of its rim pressed outwardly by springs, and an outer rim $A^{10}$, which is engaged by the spring pressed sections of the internal portion. The springs $A^{11}$, are adjustable by means of screws and nuts $A^{12}$, and by this means the belt $A^{13}$ may be caused to impart more or less driving force to the shaft $A^4$. By tightening the springs, the forming rolls may be made to drive the strip of metal forward and wholly offset the pulling strain of the vise E. Usually I adjust the springs of the pulley for a light pressure upon the rim of the pulley and allow the latter to slip, the rim $A^{10}$ being driven faster than the rolls $A^1$ and $A^2$, the latter being held back by the more slowly moving strip of material. When the strip stock is hard, heavy or stiff and difficult to shape, the springs of the pulley may be tightened. Thus it will be seen that the friction pulley serves the purposes of a compensating device, and may be used or allowed to run idly, according to the kind of stock which is being operated upon. The strip from the reel enters the rolls through an adjustable guide $A^{14}$, made desirable by the varying diameter of the reel or bundle of material on the reel standard. If desired this guide $A^{14}$ may serve as an initial die. On leaving the forming rolls the strip 1 enters the second forming die. The principal members of this second die may be an annular die $A^{15}$ and a tapered pin or mandrel $A^{16}$. A heavy block or standard $A^{17}$ supports these parts. The die $A^{15}$ is removably secured in a sleeve $A^{18}$, fitted in the block $A^{17}$, and the mandrel $A^{16}$ is adjustably held by an overhanging arm $A^{19}$ which arm is longitudinally adjustable on the top of the block $A^{17}$, being secured by set screws $A^{20}$. The sleeve $A^{18}$ has a flaring or tapered receiving throat, which may assist in shaping the strip of metal as it is drawn thereinto, but the relatively adjustable parts $A^{15}$ and $A^{16}$ perform the greater part of the work of closing the edges of the strip 1 together. The closeness with which the seam is closed depends upon the adjustment of the parts $A^{15}$ and $A^{16}$, and if desired, these parts may be so closely adjusted as to reduce the thickness of the metal operated on. The several stages of the development of the tubing are depicted in Figs. $3^a$, $3^b$, $3^c$, and $3^d$. Fig. $3^a$, shows the cross section of the strip as it leaves the reel; Fig. $3^b$, shows the cross section of the strip when in the rolls $A^1$ and $A^2$; Fig. $3^c$, shows its form at the moment that it is about to enter the die $A^{15}$, and, Fig. $3^d$, shows the form of the tube as it emerges from the die $A^{15}$. The edges of the metal strip are indicated by the character, $t$, throughout Figs. $3^a$, $3^b$, $3^c$ and $3^d$; and as shown in Fig. $3^d$, these edges are in substantial abutment when the tube leaves the forming die $A^{15}$. These abutting edges, separated by a very narrow crack, constitute the seam which is to be closed.

At the moment that the material emerges from the forming mechanism A, it has taken on its form as a tube, and, as indicated, presents its open seam at the top. The nature of the welding mechanism is such as to require the seam of the tube to occupy a definite or substantially definite plane or position, and to prepare the tubing for reception by the welding mechanism, I associate with the forming mechanism an auxiliary mechanism, which I term the tube-seam-positioning device. In the drawings, this seam positioning device is indicated by the character AA. Due to various causes, the strip of material in passing the forming mechanism is subjected to more or less torsion and the tendency is to form a tube having a spirally twisted seam or at least an irregular or wavy seam. The seam positioning device alluded to effects the correction of this tendency and causes the newly formed tubing to emerge from the forming mechanism and enter the welding mechanism with the seam of the tubing in substantially exact alinement with the axis of the tubing and directly above said axis. The tube seam positioning device may partake of various forms and it may be arranged within the confines of the forming mechanism or may be interposed between that mechanism and the welding mechanism. The particular device shown in the drawings is arranged at the throat of the die $A^{15}$ and its construction is fully shown in Figs. 1, 3, 6 and $6^a$. The sleeve $A^{18}$ is shouldered against the inner side of the block $A^{17}$ to hold it against the pull of the strip. The inner end of the sleeve $A^{18}$ is provided with a rotatable collar or ring $AA^1$ having worm wheel teeth $AA^2$ which mesh with a worm $AA^3$ on a cross shaft $AA^4$. This shaft is held in bearings $AA^5$ on the block $A^{17}$ and is provided with a squared end $AA^6$ to which a wrench may be applied to turn the shaft and the worm wheel. The collar carries a short cross bar $AA^7$ best shown in Fig. $3^c$ and Fig. $6^a$. This bar is made of hardened steel and it is so positioned that the edges of the partially formed strip engage therewith, as shown in Fig. $3^c$. By rotating the collar $AA^1$ the cross bar $AA^7$ may be tipped or tilted to depress one or the other edge of the partially formed metal strip, and in this manner the tendency of the strip to creep or twist laterally or circumferentially in the dies may be corrected. Only occasional adjustment of the positioning device AA is required to maintain the seam of the tubing in correct position.

My invention is not limited to forming the tubing in dies of the sort herein shown, but on the contrary, contemplates the substitution of a forming mechanism of any well known kind adapted to coöperate with the other elements of my mill.

The welding mechanism, B, is arranged near the last die of the forming mechanism and its operation is such that the abutting edges, $t$, $t$, of the tubing are welded together as rapidly as the tubing leaves the forming mechanism. I may employ welding or seam-closing mechanisms of various kinds in lieu of the gas-flame welder shown in the drawings, but I find this particular device to be best suited to usual requirements. The construction and operation of the welding mechanism will be quickly understood by reference to Figs. 1, 2, 3, $3^d$, $3^e$, 7 and 8. One element of the welding mechanism, B, is a gas torch, of which $B^1$ is the burner tip or nozzle. This nozzle is formed to emit a fine narrow flame and the nozzle is so positioned as to direct the flame upon the seam edges of the tubing. The position of the seam is governed and assured by the positioning device hereinbefore described, and the position of the tube, as a whole, with reference to the burner tip on the nozzle is regulated and assured by the operation of parts of the welding mechanism about to be described. It follows, that with these factors defined, the torch may be fixed or stationary with respect to the forwardly moving tubing. The parts which hold the tubing (cross-sectionally considered as a whole) in given relation to the torch nozzle are preferably two large rolls—$B^2$, $B^2$, which rotate on vertical axes. These rolls contain peripheral grooves, $B^3$, that fit the sides of the formed tubing, in the manner shown in Fig. 8. These horizontal rolls $B^2$, $B^2$, determine the position of tubing both horizontally and laterally; that is, they serve to hold the tubing against lateral movement in any direction at the welding point without interfering with the forward movement of the tubing. Preferably, these rolls $B^2$ do not meet but instead leave the extreme top and seam of the tubing exposed to the welding flame. By horizontal adjustment the rolls, $B^2$, $B^2$ may be caused to press upon the sides of the tubing and thus press the seam edges of the tubing more or less firmly together, as may be required to insure the proper welding thereof. On the bench, Z, is a transverse guide-way, $B^4$, containing blocks, $B^5$, which are adjustably secured therein by several screws $B^6$, $B^7$. The upright shafts, $B^8$ of the rolls $B^2$ rise from the blocks $B^5$ and it is by this device that the rolls $B^2$ are adjusted with respect to the interposed tubing. I prefer to cool the holding and pressure parts, by applying water thereto. Thus, in the machine herein illustrated, the rolls $B^2$, have cups or recesses $B^9$, in their tops, and the water flows into these from the pipes $B^{10}$;—overflow is prevented by drain passages and ports $B^{11}$ and $B^{12}$ in the hubs of the rolls $B^2$, and in the non-rotative shafts $B^8$ thereof.

The location of the heating or welding zone is determined by the position of the torch nozzle, and as stated the position of the tube in this zone is determined by the holding or pressure rolls $B^2$. The torch used is an approved type of oxy-acetylene gas torch. Any torch or burner of suitable type may be substituted for the torch shown, and one which utilizes a non-carbonaceous gas mixture may be advantageously employed in the production of certain kinds of tubing. I do not claim the torch proper as my invention. It comprises the nozzle B¹, the gas mixing head Bˣ, the gas pipes Bʸ and B², the cylinder Bʷ and the head Bᵛ containing the regulating valves and equipped with nipples to which respective flexible gas pipes Bᵘ and Bᵗ are joined, said pipes being connected with sources of oxygen and acetylene. The gases, being supplied in proper proportions, when ignited burn with great intensity directly at the nozzle. The flame emitted may be described as of two parts, the first being a short intensely hot flame, and the second, a large relatively far extending corona of lower temperature. An instant's application of the short narrow flame to the edges of the metal tubing causes them to become molten and to flow together. Then if either the flame or the tube be removed the metal cools, leaving the edges in welded condition. Careful regulation of the flame, and of the distance between the nozzle and the tubing, and of the speed of movement of the tubing, are required to produce a uniform continuous weld, and these regulations are all accurately accomplished by the herein described machine or mill. The welding torch, as clearly shown in Fig. 7, is positioned to direct the flame downwardly and rearwardly at an angle to the tubing, so that the flame enters between the rolls B² and the corona spreads along the top of the tubing toward the die block A¹⁷. One purpose of the arrangement is to utilize otherwise wasted heat, to preheat the edges of the seam in advance of actual welding by the intensely hot short flame before referred to. The preheating may be increased if desired by another torch, as indicated in dotted lines in Fig. 7. Any such preheating lessens the time required to weld the seam and consequently permits the tubing to be passed through the machine more rapidly. The welding torch is supported in such manner that it may be quickly adjusted to working position or moved away. Figs. 7 and 8 disclose the parts by which the torch is thus supported. B¹² are brackets extending from the upper ends of the stud shafts B⁸ and carrying a cross rod B¹⁴, at about the middle of which is an adjustable but normally fixed arm B¹⁵. Pivoted on the end of arm B¹⁵, is a torch carrying lever B¹⁶, and the arm and lever are provided with stop shoulders B¹⁷ by which the downward movement of the lever is limited. B¹⁸ is a split clamping block containing a split sleeve B¹⁹. The part B¹⁸ is connected to the lever B¹⁶ by a horizontal stud, B¹⁸ᵃ and the sleeve B¹⁹ is fastened on the torch member Bʸ. This arrangement permits two independent movements of the torch, the first being swinging movement in a vertical plane, i. e. in the plane in which it moves on the pivot in arm B¹⁵, and the second movement permitted being rotation in the block B¹⁸. Obviously these movements admit of any desired manual adjustment of the torch nozzle, with respect to the tubing between the rolls B². For limiting the vertical swing of the torch and to enable the nice adjustment of the nozzle, the block B¹⁸ and the lever B¹⁶ are connected by a spring resisted thumb screw B²⁰. By turning this, the torch may be swung with respect to the lever B¹⁶, to raise or lower the nozzle. By raising the free end of the lever B¹⁶, the torch may be quickly swung away from the tubing, without disturbing the nice adjustment of the thumb screw B²⁰ and the stop shoulder B¹⁷; and when again lowered the nozzle will assume its correct relation to the seam of the tubing. If the flame chances to play at one side or the other of the seam the defect may be quickly remedied by twisting the torch and sleeve B¹⁹ in the block B¹⁸. Metal which is vaporized by the welding flame sometimes condenses upon the tip of the nozzle and tends to distort the welding flame. The metal thus deposited may be easily knocked off the nozzle. To relieve the attendant from that duty an automatic knock off device is provided, the same comprising a light metal finger or bar B²¹ which is carried by the lever B²², pivoted at B²³, see Figs. 3, 7 and 8. One of the two rolls B² is provided with a series of lugs or pins B²⁴ which strike and operate the end of the lever B²², thereby reciprocating the finger B²¹. The lever and finger are returned by a spring. The end of the finger is concaved to fit the nozzle, and each time that it is thrust back by the lever and lugs, it scrapes or knocks the accumulated metal off the nozzle tip.

From the foregoing it will be clear that the confined abutting edges of the tube are welded together at the instant of passage between the holding rolls B² or at the instant immediately following the full impingement of the welding flame. It will also be clear that this welding operation goes on steadily, as fast as the tubing is fed or drawn into the welding mechanism. Attention is called to the very small area or portion of the tube which is exposed to the hot flame between the rolls B² of the welding mechanism. While the remainder of the tube is heated, the comparatively cool rolls chill the tubing, prevent its attaining a red heat except in the exposed parts, and in this way possible distortion of the tubing is prevented, and it is permitted to retain nearly the whole of its strength, which latter is seen to be of prime importance when the resistance of the forming mechanism and the heavy pulling force of the traveling vise are considered.

As an intermediate step of my process, I cool the welded portion of the tubing as fast as it emerges from the welding mechanism; accomplishing this in the machine shown, by spraying water upon the tubing from a pipe, $B^{25}$, having a flat nozzle, $B^{26}$, at its lower end. The water from the several places of use is conducted away by a drain; that from the spray nozzle $B^{26}$ falling into a drain pan $B^{27}$. A further purpose in cooling the tubing after it is welded, is to prepare it for the removal of the raised seam or bur (indicated in Fig. $3^e$) which usually forms on the top of the tubing during the welding operation. If the tube were allowed to remain hot it would detrimentally effect any bur removing tool which is used.

As previously stated it is preferable to remove the bur immediately after the tubing is welded and before performing any further operations thereon, but it should be understood that this operation may follow or be merged with other operations. The bur removing mechanism, C, appears in Figs. 1, 2, 3 and 7, of the drawings. For circular or oval tubing, it comprises a planer knife, tool or blade $C^1$, positioned in alinement with the tubing and which conforms to the top thereof. The tool is arranged at an angle to the axis of the tubing and is rigidly held by a block or standard $D^1$ which forms a part of the tube finishing or reducing mechanism. As clearly shown in Figs. 3 and 7 the tool is vertically adjustable on the end $C^2$ of an arm $C^3$ which is fastened to and overhangs the top of the standard $D^1$. As the tubing travels beneath the sharp edge of the planer tool the latter turns, cuts or scrapes off the bur, leaving the top of the tubing as smooth as other surfaces thereof, and making the seam practically invisible.

Upon passing the planer or bur remover, the welded tubing enters the reducing die or dies. This step consists in reducing the diameter of the tubing and in straightening the tubing. These operations are performed jointly by the drawing vise E, and the mechanism D. As represented in the drawings, (Fig. 7) the vise pulls the tubing through a die $D^2$ set in a sleeve $D^3$ that is held by the block $D^1$. This die $D^2$ is considerably smaller than that portion of the tubing which has just been welded and hence as the tubing is drawn through the die it (the tubing) is reduced and smoothed and straightened, the operation correcting any distortion which may have resulted from the forming and welding operations. As the friction is considerable, between the tubing and the die $D^2$, these parts are lubricated with heavy grease that is supplied from a cup $D^4$ attached to the receiving end of the sleeve $D^3$.

I have hereinbefore referred to the fact that one of the important purposes of my invention is to provide for the continuous manufacture of tubing so that the process of converting the strip of metal into tubing may be carried on without interruption. This makes it desirable that the metal shall pass through the successive stages of development at a constant maximum rate of speed and without interruption in the travel thereof. This step is accomplished by the automatic vise or traveling mechanism which maintains the metal in movement through the different stages in the process. In the machine shown, this vise is arranged for straight tubing. It is preferably positioned at that point of the travel of the metal where the formed tubing emerges from the reducing and perfecting mechanism D so that it draws or pulls the strip through the forming, the welding, the planing and the reducing mechanisms and pushes the formed tubing through the polishing and cut-off mechanisms. The vise mechanism has two opposed gripping portions $E^1$, $E^1$, divided into and composed of pairs of sections or jaws $E^2$ which move successively into alinement with and automatically clamp the tubing as the vise travels. The compressive force with which the vise clamps the tubing is sufficient to take firm hold upon it and draw the tubing along without distorting it.

The jaws $E^2$ are arranged in pairs and are mounted upon two parallel endless chains $E^3$ running over corresponding sprockets $E^4$ and $E^5$ respectively, (Figs. 4, 9, 10, 11, and 12). They comprise small blocks of metal having opposed gripping faces $E^6$ conformed to the curvature of the tubing so as to uniformly distribute the clamping pressure around substantially the circumference of the tubing; cross-sectionally uniform tension upon the tubing being thus insured. It is to be observed that the vise is of considerable length so that a plurality of pairs of jaws are at any given instant, in gripping engagement with the tubing. I prefer this arrangement for the reason that the clamping pressure is distributed over quite a length of tubing and a safer and firmer hold is secured upon the tubing and at the same time the pressure upon any given point is comparatively light, hence in this manner I am enabled to preserve the shape of the tubing and still effect a powerful pull upon it. The jaws are laterally slidable or movable upon the connecting rods $E^7$ extending between corresponding points on the two chains, two of these rods being provided for each pair of jaw sections to insure their stability and prevent them from tilting. Between each pair of jaws I interpose a small spring $E^8$ to keep the jaws normally open so that, as they rise around the forward end of the vise, they will properly pass into alinement with the tube, and as they move downwardly away from the tube they will spread and release the tubing. However, at the latter or delivery end of the vise I provide a spreader or opener $E^9$ (Fig. 4) which is positioned in the path of the jaws and which positively wedges or spreads them apart at that point. The jaws are automatically closed upon the tube by mechanism which causes them to exert a clamping pressure upon the tubing. In this machine the pressure mechanism comprises two parallel bars or guide members $E^{10}$ lying parallel with the upper side of the moving chains and forming a groove or channel through which the jaw sections travel in succession. The forward ends $E^{11}$ of these pressure guides are flared or arranged as cams so that as the jaws rise upward and enter the forward end of the channel they are caused to gradually move toward each other and into clamping engagement with the tube, in which condition they are maintained until they reach the spreader at the opposite end of the channel. The opposite ends $E^{12}$ of the guide members are also flared or cut away so as to allow the jaws to open as the spreader enters between them. The guide members are mounted upon the bed plate $E^{24}$ of the machine. If the vise sections were to travel through the channel in direct contact with the faces of the guide members the friction would be so great as to make it difficult to drive the vise. For this reason I interpose a plurality or series of roller bearings $E^{13}$ between the vise sections and the faces of the guides by which I reduce the friction losses to a minimum (Fig. 4). These rollers run in races $E^{14}$ which lie around the outer faces of the guides and communicate at each end with the spaces between the guides and the jaws so as to deliver the rolls to the vise at the forward end and receive them at the opposite end of the vise mechanism. The races are formed by ledges $E^{15}$ on the lower portions of the guides and by the guards $E^{16}$ secured thereto. The rollers have small peripheral grooves (Fig. 11) which register with ribs $E^{17}$ on the faces of the guides to prevent the rollers from becoming displaced. It will be noted that I proportion the size of the rolls and the length of the jaws so that at any given instant each jaw is in contact with at least two, and preferably, three rollers, my purpose being to make the pressure uniform throughout the length of each of the jaws and positively prevent disalinement or tilting of the jaws while in engagement with the tubing. The guide members are slidable upon the bed plate $E^{24}$ of the machine and may be adjusted by means of the screws $E^{18}$ so that the clamping pressure of the vise may be regulated to any degree found to be suitable for the purpose. These screws are mounted upon upstanding lugs $E^{19}$ and they set against U-shaped members $E^{20}$ which bridge the roller races and have their ends $E^{21}$ set in sockets provided therefor on the guides. Across the top of the vise I arrange a number of parallel shafts $E^{22}$ journaled in the upstanding lugs $E^{19}$ and carrying rollers $E^{23}$ which ride upon the upper faces of the vise sections, the purpose of these devices being to hold the vise sections flat upon the plate $E^{24}$ along which they travel, and to prevent the jaw from rising upwardly or getting out of alinement. The forward sprockets $E^4$ of the vise are mounted upon a shaft $E^{24}$ journaled in bearings $E^{26}$, mounted upon the bench. The vise derives its power from the rear shaft $E^{27}$ on which the rear sprockets $E^5$ are mounted and through the medium of a train of speed reducing gears driven from any suitable source of power. The speed reducing mechanism comprises the two sets of gears $E^{28}$, $E^{29}$ and $E^{30}$, $E^{31}$ and the shafts $E^{32}$, $E^{33}$ (Figs. 4, 10 and 12). The shaft $E^{32}$ is journaled in suitable bearings on the frame or bench, Z, and carries a large sprocket $E^{34}$, driven by a chain belt $E^{35}$ from the source of power. The other end of the shaft carries the pinion gear $E^{28}$ which drives a large gear $E^{29}$ on the corresponding end of the shaft $E^{33}$. The opposite end of shaft $E^{33}$ carries the pinion gear $E^{30}$ which drives the large gear $E^{31}$ on the rear shaft $E^{27}$ of the vise.

In some cases I equip my mill with an automatic polishing mechanism F. This mechanism is not essential to the manufacture of tubing and in that sense is not a part of this present invention. I do not claim the polishing mechanism in this application and a full description thereof is unnecessary. The drum $F^1$ is hollow and is supported in bearings $F^8$, to rotate about the tubing. The drum contains a plurality of abrasive blocks or sticks indicated by $F^6$. It is driven by a belt $F^9$ from a pulley $F^{10}$ on the shaft $fg$ which is driven by the motor FG.

My invention contemplates the cutting of the tubing into lengths as a necessary part of the process of manufacturing tubing continuously, and I accomplish this by the mechanisms G and H which automatically measure the tubing and cut off measured lengths while the tubing is in movement and without interrupting the continuous operation of the other parts of the machine. For this purpose I provide a gage $H^2$ which, when the proper length of tubing is formed, automatically acts in conjunction with the traveling vise to put the cutting mechanism into operation and both move with the tubing while the cutting operation takes place. This mechanism comprises, preferably, an automatic cut-off device which firmly clamps the tubing, travels in unison with the tubing until it severs the length measured off by the gage, automatically releases its hold upon and discharges the tubing and finally returns to its normal condition ready for the next operation. The gage $H^2$ when set marks the outer end measuring point and the cutter $G^1$ marks the inner end measuring point upon the tubing.

The cutter proper is a high speed swing-saw $G^1$, associated with a tube clamp $G^2$ and a gage or measuring mechanism $H^2$, controlled by the movement of the tubing. The cutter $G^1$ is mounted in the upper end of a swing frame $G^3$ strengthened by cross bars $G^{3'}$ and the cutter operates in a transverse plane. The cutter shaft $G^4$ is journaled in the upper end of the swinging frame $G^3$ and is longitudinally movable to permit the cutter to move with the tubing while cutting it. A wide pulley $G^5$ is mounted on shaft $fg$ and the cutter shaft is driven by a belt $G^6$ running over a flanged pulley $G^7$. The motions of the cutter are controlled by the tubing and the measuring gage $H^2$. A spiral spring $G^8$ serves to return the cutter frame after it has operated. A stationary table $G^{10}$ on brackets $G^{11}$ supports a sliding carriage $G^{12}$, movable parallel with the tubing. The carriage after operation is retracted by a weight $G^{13}$ connected thereto by cable $G^{14}$ passing over pulley $G^{15}$. The tube clamps $G^2$ are mounted on the carriage. Each clamp comprises a movable jaw $G^{16}$ and a fixed jaw $G^{17}$, the former arranged for operation by the measuring device $H^2$. The cutter works in the gap between the clamps. The upper jaws are operated in unison by cam shafts $G^{18}$ connected by arms $G^{19}$ and strap $G^{20}$. One of the arms is a bell crank, having an additional arm $G^{21}$ which carries a trigger $G^{22}$ engageable with a projection $G^{23}$ on the table $G^{10}$. In one direction the trigger is limited by a stop shoulder $G^{24}$ on the bell crank and when the carriage begins to move forward the trigger strikes the stationary projection $G^{23}$ and operates the cam shafts and clamps to connect the carriage to the tube. In returning, the trigger passes freely over the projection $G^{23}$. The clamps are released at the end of the forward movement, after the cutting operation, by the engagement of a projection $G^{25}$ with an arm $G^{26}$ upstanding from the stationary table, which engagement swings the cams of the clamps in the opposite direction to open the clamps. The traveling motion of the cutter is brought about by means of a lateral arm or extension $G^{27}$ rigidly secured to the carriage $G^{12}$ and movable with it. The free end of this arm has a slotted connection with the cutter shaft $G^4$ and operates between a collar $G^{29}$ and the flanged pulley $G^7$ both fixed on the shaft $G^4$. This moves the cutter in unison with the carriage $G^{10}$. The slotted connection permits the transverse movement of the cutter. Beneath the table is a transversely slidable bar $G^{30}$ having a depending lug $G^{31}$ which constitutes the fulcrum for a latch bar $G^{32}$ extending through the upper portion of the swinging cutter frame and having a hooked end $G^{33}$ for engagement with a latch $G^{34}$ on the swinging cutter frame shown in Fig. 15. The latch bar $G^{34}$ is held in position shown in Fig. 15 by a spring between its short arm and bar $G^{30}$. The bar $G^{30}$ slides in guides on the bottom of the table $G^{10}$. Sliding movement is imparted by a bell crank $G^{38}$ pivoted on the table $G^{10}$. Its arm $G^{39}$ is connected by a slot and pin connection to the carriage $G^{12}$ for operation by its movement. The bell crank $G^{38}$ operates the bar $G^{30}$ through link $G^{37}$ and post $G^{36}$. The link $G^{37}$ has an adjustable or variable throw connection with the bell crank $G^{38}$, as shown in Fig. 20. Forward movement of the carriage $G^{12}$ causes the bar $G^{30}$ to move the swinging cutter frame toward the tubing to sever the tubing. The final movement of the bars $G^{30}$ and $G^{32}$ releases the cutter frame through the striking of an adjustable cam projection $G^{35}$ on the bar $G^{32}$, against the table $G^{10}$, and retracts the hook $G^{33}$ from engagement with the swinging frame. The cutter frame is thereupon returned by the spring before mentioned.

As previously stated, the cutter marks the inner end measuring point of the tubes and as the carriage always moves with the cutter, it may be employed to operatively join the gage $H^2$ and the cutter. The connection comprises a rod $H^3$ rotatively mounted but longitudinally fixed in blocks $G^{40}$ on the carriage $G^{12}$. The rod parallels the tubing. Its outer end is supported by a movable standard $H^4$, in which it may slide. The length of the rod exceeds the length of the longest tube to be made. The rod carries the gage $H^2$ which is in the form of a cross arm, adjustable on the rod, as required to measure and determine the length of succeeding tubes. One or more supports or guides $H^8$ are used to sustain the tube in its travel. These supports are stationary. They serve to direct the end of the tubing against the gage. Whenever this happens, the gage will be thrust forward, and this movement being communicated to the carriage $G^{12}$ through the rod $H^3$, the carriage will be clamped to the tubing and the tubing will be severed by the cutter as before explained. The inner end of the rod $H^3$ has a rocker arm $H^5$ which in the final forward movement of the rod and carriage rides upon a stationary cam $H^6$. This action rotates the rod $H^3$ and removes the gage $H^2$ from the end of the severed tube, freeing both the tube and cutter carriage, whereupon the carriage and the rod are retracted by the weight acting through the cable G^14 before described; meantime the rod is restored by a weight H^7 on the cross arm or gage H^2.

The principal source of power for the machine is in the chain belt E^35 which drives the continuous vise E. The latter, as it will now be understood, firmly engages the tubing and forcibly draws the strip of material and the tubing formed therefrom through the forming mechanism, the welding mechanism, the bur removing mechanism, and the tube shaping or reducing and straightening mechanism, while at the same time, it forcibly projects the finished tubing through the cut-off mechanism G, and against the measuring gage H. Very little power from the motor FG is required to rotate the cut-off saw or grinder, and little is expended through the friction pulley A^10 belonging to the forming rolls.

One of the several ways of starting the machine is as follows: I place the end of the strip stock in the guide A^14 and enter it between the rolls A^1 and A^2. I then turn the rolls and thereby advance the strip and begin the forming operation. I then pass a "threading" tube rearwardly through the pulling mechanism E, the die D^2, the rolls B^2 and the die A^15, first removing the mandrel A^16. Then I conform the end of the stock to the end of the tube and weld them together. This welding may be done with a hand torch, using oxygen and acetylene. To insure the gripping action of the jaws of the pulling mechanism upon the tube, I insert a temporary filler between the jaws and the tube, the filler being of sufficient length to act with the tube until the stock sufficiently enters the pulling mechanism. This filler should be a strip of soft metal of such thickness as to compensate for the difference in the sizes of the tube and the dies. It may be inserted most conveniently by temporarily backing off the set screws E^18 and opening the jaws of the pulling mechanism. After it is put in place the set screws should be again tightened to restore the jaws to proper working position. Having prepared the parts in this way, I then start the pulling mechanism into rotation and thereby pull the tube and the attached stock through the several tools. When the end of the stock emerges from the pulling mechanism 10 the "threading" tube should be cut off.

In manufacturing butt welded tubing upon the above described machine I make use of flat strip metal stock of a width approximating three times the diameter of the tubing to be produced. I provide this stock in the form of metal strips each of sufficient length to produce a large number of tubes; and preferably I weld or otherwise connect the strips end to end in continuing series and thereby in effect maintain a continuous source of supply of the flat strip stock. It will be understood that the strips are of uniform cross section, i. e., of the same thickness and width.

The length of the machine or apparatus herein described rarely exceeds ten feet, even for tubing of the larger sizes. Its width is correspondingly small. Within this small space all of the operations essential to the manufacture of tubing may be performed with such accuracy as to turn out finished tubing at the rate of many feet per minute.

The terms "welding", "weld" and "welded", as used hereinbefore and hereinafter, should be construed broadly as meaning the uniting of the edges of the tubing by heat whether with or without the aid of other materials such as iron, steel, brass, copper, aluminum and the like.

While the machine herein illustrated is constructed to make tubing I wish it to be understood that my invention is adapted to the production of similar or different metal articles. Indeed, various modifications of my invention and various combinations and uses of the mechanism herein described, all within the scope of my invention, will readily suggest themselves to one who is skilled in the art.

The welding mechanism which is characterized by the tube-positioning rolls B^2 and the gas torch is not herein specifically claimed, but constitutes the subject-matter of my divisional application, Serial No. 690,934 filed April 15, 1912, entitled Continuous welding mechanism. The continuous traveling vise herein shown but not claimed is specifically described and claimed in my divisional application, Serial No. 690,935 filed April 15, 1912, entitled Vise or draft mechanism. Similarly I have not herein specifically claimed the cut-out mechanism, but same is described and claimed in my divisional application, Serial No. 690,936 filed April 15, 1912 entitled "Cut-off mechanism."

Having thus described my invention I claim as new and desire to secure by Letters Patent:—

1. A continuous tube mill adapted to convert substantially continuous flat strip metal stock into welded tubes of specified cross section and respectively specified lengths, comprising forming, positioning, welding, deburring, reducing, measuring, and cut-off mechanisms arranged in operative alinement and simultaneously coöperative to set and maintain the stock in motion longitudinally, and without interrupting such motion, progressively form the stock into initial tubing having a longitudinal seam, position said seam for welding, weld the same, remove the weld bur, reduce the tubing to specified cross section, measure successive resultant end portions of the tubing and finally sever such resultant end portions in the form of tubes of respectively measured lengths.

2. A continuous tube mill adapted to convert substantially continuous flat strip metal stock into welded tubes of definite cross section and lengths, comprising forming, positioning, welding, deburring, reducing and cutting mechanisms arranged in operative alinement and simultaneously coöperative to set and maintain the stock in motion longitudinally and without interrupting such motion, progressively form the stock into initial tubing having a longitudinal seam, position said seam for welding, weld the same, remove the weld bur, reduce the tubing to specified cross section, and finally sever resultant end portions in the form of separate tubes.

3. A continuous tube mill adapted to convert metal tube stock into welded tubes of specified cross section and respectively specified lengths, comprising positioning, welding, deburring, reducing, measuring and cut-off mechanisms arranged in operative alinement and simultaneously coöperative to set and maintain the stock in motion longitudinally, and without interrupting such motion, progressively position the seam for welding, weld the same, remove the weld bur, reduce the tubing to specified cross section, measure successive resultant end portions of the tubing and finally sever such resultant end portions in the form of tubes of respectively measured lengths.

4. A continuous tube mill adapted to convert substantially continuous flat strip metal stock into welded tubing of specified cross section, comprising forming, positioning, welding, deburring and reducing mechanisms arranged in operative alinement and simultaneously coöperative to set and maintain the stock in motion longitudinally, and without interrupting such motion, progressively form the stock into initial tubing having a longitudinal seam, position said seam for welding, weld the same, remove the weld bur and reduce the resultant tubing to specified cross section.

5. A continuous tube mill adapted to convert substantially continuous flat strip metal stock into welded tubes of definite cross section and respectively specified lengths, comprising forming, positioning, welding, deburring, measuring and cut-off mechanisms arranged in operative alinement and simultaneously coöperative to set and maintain the stock in motion longitudinally, and without interrupting such motion, progressively form the stock into tubing having a longitudinal seam, position said seam for welding, weld the same, remove the weld bur, measure successive end portions of the tubing and finally sever such end portions in the form of tubes of respectively measured lengths.

6. A continuous tube mill adapted to convert substantially continuous flat strip metal stock into welded tubes of definite cross section, comprising forming, positioning, welding, deburring and cut-off mechanisms arranged in operative alinement and simultaneously coöperative to set and maintain the stock in motion longitudinally, and without interrupting such motion, progressively form the stock into tubing having a longitudinal seam, position said seam for welding, weld the same, remove the weld bur, and finally sever resultant end portions in the form of separate tubes.

7. A continuous tube mill adapted to convert substantially continuous flat strip metal stock into welded tubes of specified cross section, comprising forming, positioning, welding, reducing and cut-off mechanisms arranged in operative alinement and simultaneously coöperative to set and maintain the stock in motion longitudinally, and without interrupting such motion, progressively form the stock into initial tubing having a longitudinal seam, position said seam for welding, weld the same, reduce the tubing to specified cross section, and finally sever resultant end portions in the form of separate tubes of predetermined length.

8. A continuous tube mill comprising positioning, welding, deburring, measuring and cut-off mechanisms arranged in operative alinement and simultaneously coöperative to set and maintain the stock in motion longitudinally, and without interrupting such motion, progressively position the stock and its seam for welding, weld the same, remove the weld bur, measure successive resultant end portions of the tubing and finally sever such resultant end portions in the form of tubes of respectively measured lengths.

9. A continuous tube mill comprising positioning, welding, reducing and cut-off mechanisms arranged in operative alinement and simultaneously coöperative to set and maintain the stock in motion longitudinally, and without interrupting such motion, progressively position the stock and its seam for welding, weld the same, reduce the tubing to specified cross section, and finally sever successive resultant end portions in the form of separate tubes.

10. A continuous tube mill adapted to convert substantially continuous flat strip metal stock into welded tubing, comprising forming, positioning, welding and deburring mechanisms arranged in operative alinement and simultaneously coöperative to set and maintain the stock in motion longitudinally, and without interrupting such motion, continuously form the stock into tubing having a longitudinal seam, progressively position said seam for welding, weld the same, remove the weld bur, and continuously project the deburred tubing, substantially as described.

11. A continuous tube mill adapted to convert substantially continuous flat strip metal stock into welded tubes of respectively specified lengths, comprising forming, positioning, welding, measuring and cut-off mechanisms arranged in operative alinement and simultaneously coöperative to set and maintain the stock in motion longitudinally, and without interrupting such motion, progressively form the stock into tubing having a longitudinal seam, position said seam for welding, weld the same, measure successive resultant end portions of the tubing and finally sever such resultant end portions in the form of tubes of respectively measured lengths.

12. A continuous tube mill adapted to convert substantially continuous flat strip metal into welded tubes, comprising forming, positioning, welding and cut-off mechanisms arranged in operative alinement and simultaneously coöperative to set and maintain the stock in motion longitudinally, and without interrupting such motion, progressively form the stock into tubing having a longitudinal seam, position said seam for welding, weld the same, and finally sever the successive end portions of the resultant tubing.

13. A continuous tube mill comprising positioning, welding, measuring and cut-off mechanisms arranged in operative alinement and simultaneously coöperative to set and maintain the stock in motion longitudinally, and without interrupting such motion, progressively position the stock and its seam for welding, weld the same, measure successive resultant end portions of the tubing and finally sever such resultant end portions in the form of tubes of respectively measured lengths.

14. A continuous tube mill adapted to convert substantially continuous flat strip metal stock into welded tubing of specified cross section, comprising forming, positioning, welding and reducing mechanisms arranged in operative alinement and simultaneously coöperative to set and maintain the stock in motion longitudinally, and without interrupting such motion, progressively form the stock into initial tubing having a longitudinal seam, position said seam for welding, weld the same, reduce the tubing to specified cross section and continuously project the resultant tubing.

15. A continuous tube mill adapted to convert substantially continuous flat strip metal stock into welded tubing, comprising forming, seam straightening, tube positioning and welding mechanisms arranged in operative alinement and simultaneously coöperative to set and maintain the stock in motion longitudinally, and without interrupting such motion, progressively form the stock into tubing having a longitudinal seam, progressively straighten and position said seam for welding and immediately weld the seam as the tubing progresses.

16. A continuous tube mill adapted to convert substantially continuous flat strip metal stock into welded tubes of specified cross section and respectively specified lengths, comprising forming, welding, deburring, reducing, measuring and cut-off mechanisms arranged in operative alinement and simultaneously coöperative to set and maintain the stock in motion longitudinally, and without interrupting such motion, progressively form the stock into initial tubing having a longitudinal seam, weld the same, remove the weld bur, reduce the tubing to specified cross section, measure successive resultant end portions of the tubing and finally sever such resultant end portions in the form of tubes of respectively measured lengths.

17. A continuous tube mill adapted to convert substantially continuous flat strip metal stock into welded tubes of specified cross section, comprising forming, welding, deburring, reducing and cut-off mechanisms arranged in operative alinement and simultaneously coöperative to set and maintain the stock in motion longitudinally, and without interrupting such motion, progressively form the stock into initial tubing having a longitudinal seam, weld the same, remove the weld bur, reduce the tubing to specified cross section, and finally sever successive resultant end portions of the tubing in the form of separate tubes.

18. A continuous tube mill adapted to convert longitudinally seamed tubular metal stock into welded tubes of specified cross section, comprising welding, deburring, reducing and cut-off mechanisms arranged in operative alinement and simultaneously coöperative to set and maintain the stock in motion longitudinally, and without interrupting such motion, progressively weld the seam thereof, remove the weld bur, reduce the tubing to specified cross section, and finally sever successive end portions thereof in the form of separate tubes.

19. A continuous tube mill adapted to convert substantially continuous flat strip metal stock into welded tubing of specified cross section, comprising forming, welding, deburring and reducing mechanisms arranged in operative alinement and simultaneously coöperative to set and maintain the stock in motion longitudinally, and without interrupting such motion, progressively form the stock into initial tubing having a longitudinal seam, progressively weld the same, progressively remove the weld bur and progressively reduce the tubing to specified cross section.

20. A continuous tube mill adapted to convert substantially continuous flat strip metal stock into welded tubes of respectively specified lengths, comprising forming, welding, deburring, measuring and cut-off mechanisms arranged in operative alinement and simultaneously coöperative to set and maintain the stock in motion longitudinally, and without interrupting such motion, progressively form the stock into tubing having a longitudinal seam, weld the same, remove the weld bur, measure successive resultant end portions of the tubing and finally sever such resultant end portions in the form of successive tubes of respectively measured lengths.

21. A continuous tube mill adapted to convert substantially continuous flat strip metal stock into welded tubes, comprising forming, welding, deburring and cut-off mechanisms arranged in operative alinement and simultaneously coöperative to set and maintain the stock in motion longitudinally, and without interrupting such motion, progressively form the stock into tubing having a longitudinal seam, weld the same, remove the weld bur, and finally sever successive resultant end portions in the form of separate tubes.

22. A continuous tube mill adapted to convert substantially continuous flat strip metal stock into welded tubes of specified cross section and respectively specified lengths, comprising forming, welding, reducing, measuring and cut-off mechanisms arranged in operative alinement and simultaneously coöperative to set and maintain the stock in motion longitudinally, and without interrupting such motion, progressively form the stock into initial tubing having a longitudinal seam, weld the same, reduce the tubing to specified cross section, measure successive resultant end portions of the tubing and finally sever successively resultant end portions in the form of tubes of respectively measured lengths.

23. A continuous tube mill adapted to convert substantially continuous flat strip metal stock into welded tubes of specified cross section, comprising forming, welding, reducing and cut-off mechanisms arranged in operative alinement and simultaneously coöperative to set and maintain the stock in motion longitudinally, and without interrupting such motion, progressively form the stock into initial tubing having a longitudinal seam, weld the same, reduce the tubing to specified cross section, and finally sever successive resultant end portions thereof in the form of separate tubes.

24. A continuous tube mill comprising welding, reducing and cut-off mechanisms arranged in operative alinement and simultaneously coöperative to set and maintain the stock in motion longitudinally, and without interrupting such motion, progressively weld the seam of the tubular stock, reduce the resultant tubing to specified cross section, and finally sever successive end portions in the form of separate tubes.

25. A continuous tube mill adapted to convert substantially continuous flat strip metal stock into welded tubes of respectively specified lengths, comprising a forming mechanism, a welding mechanism and measuring and cut-off mechanism arranged in operative alinement and simultaneously coöperative to set and maintain the stock in motion longitudinally, and without interrupting such motion, progressively form the stock into initial tubing having a longitudinal seam, weld the same, and finally sever successive resultant end portions in respectively measured lengths.

26. A continuous tube mill adapted to convert longitudinally seamed tubular metal stock into welded tubes of predetermined lengths, comprising welding and cut-off mechanisms arranged in operative alinement and simultaneously coöperative to set and maintain the stock in motion longitudinally and progressively weld the seam of the stock, and finally sever resultant end portions thereof in the form of tubes of predetermined lengths.

27. A continuous tube mill adapted to convert longitudinally seamed tubular metal stock into welded tubes, comprising welding, deburring and cut-off mechanisms arranged in operative alinement and simultaneously coöperative to set and maintain the stock in motion longitudinally, and without interrupting such motion, progressively weld the seam thereof, remove the weld bur, and finally sever resultant end portions thereof in the form of tubes of predetermined lengths.

28. A continuous tube mill adapted to convert substantially continuous flat strip metal stock into tubes of specified cross section and respectively specified lengths, comprising forming, reducing, measuring and cut-off mechanisms arranged in operative alinement and simultaneously coöperative to set and maintain the stock in motion longitudinally, and without interrupting such motion, progressively form the stock into initial tubing having a longitudinal seam, reduce the tubing to specified cross section, measure successive resultant end portions of the tubing and finally sever such resultant end portions in the form of tubes of respectively measured lengths.

29. A continuous tube mill adapted to convert substantially continuous flat strip metal stock into tubes of specified cross section and respectively specified lengths, comprising forming, reducing and cut-off mechanisms arranged in operative alinement and simultaneously coöperative to set and maintain the stock in motion longitudinally, and without interrupting such motion, progressively form the stock into initial tubing having a longitudinal seam, reduce the tubing to specified cross section, and finally sever successive resultant end portions in the form of separate tubes.

30. A continuous tube mill adapted to convert substantially continuous flat strip metal stock into tubes of respectively specified lengths, comprising forming, measuring and cut-off mechanisms arranged in operative alinement and simultaneously coöperative to set and maintain the stock in motion longitudinally, and without interrupting such motion, progressively form the stock into tubing having a longitudinal seam, measure successive end portions of the tubing and finally sever such end portions in the form of tubes of respectively measured lengths.

31. A continuous tube mill adapted to convert substantially continuous flat strip metal stock into tubes, comprising forming and cut-off mechanisms arranged in operative alinement in the order named and simultaneously coöperative to set and maintain the stock in motion longitudinally and progressively form the stock into tubing having a longitudinal seam, and finally sever successive end portions thereof without interrupting said movement and formation of the stock.

32. A continuous tube mill adapted to convert substantially continuous longitudinally seamed tubular metal stock into tubes of specified cross section and respectively specified lengths, comprising reducing, moving, measuring and cut-off mechanisms arranged in operative alinement and simultaneously coöperative to set and maintain the stock in motion longitudinally, and without interrupting such motion, progressively reduce the tubing to specified cross section, measure successive resultant end portions of the tubing and finally sever such resultant end portions in the form of tubes of respectively measured lengths.

33. A continuous tube mill adapted to convert substantially continuous longitudinally seamed tubular metal stock into tubes of specified cross section, comprising reducing and cut-off mechanisms arranged in operative alinement and simultaneously coöperative to set and maintain the stock in motion longitudinally, and without interrupting such motion, progressively reduce the tubing to specified cross section, and finally sever successive resultant end portions in the form of separate tubes.

34. A continuous tube mill adapted to convert substantially continuous longitudinally seamed tubular metal stock into tubes of respectively specified lengths, comprising moving, measuring and cut-off mechanisms arranged in operative alinement and simultaneously coöperative to set and maintain the stock in motion longitudinally, and without interrupting such motion, measure successive end portions of the tubing and finally sever such end portions in the form of tubes of respectively measured lengths.

35. A continuous tube mill adapted to convert substantially continuous longitudinally seamed tubular metal stock into tubes of respectively specified lengths, comprising moving and cut-off mechanisms arranged in operative alinement and simultaneously coöperative to set and maintain the stock in motion longitudinally, and without interrupting such motion, sever successive forward end portions thereof in the form of successive tubes.

36. A continuous mill adapted to convert a single piece of strip metal stock into a series of welded tubes of definite cross section and respectively definite lengths, comprising tube forming members in combination with a welder, a deburring device, a reducer, a continuous draft mechanism and measuring and cut-off mechanism, arranged in alinement in the order named and simultaneously operative upon the stock, substantially as described.

37. A continuous mill adapted to convert a single piece of strip metal stock into a series of welded tubes of definite cross section and respectively definite lengths, comprising tube forming members, in combination with a welder, a reducer, a continuous draft mechanism and measuring and cut-off mechanism, arranged in alinement in the order named and simultaneously operative upon the stock, substantially as described.

38. A continuous mill adapted to convert a single piece of strip metal into a series of welded tubes of definite cross section and respectively definite lengths, comprising tube forming members, in combination with a welder, a continuous draft mechanism and measuring and cut-off mechanism, arranged in alinement in the order named, and simultaneously operative upon the stock, substantially as described.

39. A continuous mill adapted to convert a single piece of strip metal stock into a series of tubes of definite cross section and respectively definite lengths, comprising tube forming members, in combination with a reducer, a continuous draft mechanism and measuring and cut-off mechanism, arranged in alinement in the order named and simultaneously operative upon the stock, substantially as described.

40. A continuous mill adapted to convert a single piece of strip metal into a series of pieces of definite cross section and respectively definite lengths, comprising progressive bending members, in combination with a finishing die, a continuous draft mechanism and measuring and cut-off mechanism, arranged in alinement in the order named and simultaneously operative upon said stock, substantially as described.

41. A continuous mill adapted to convert a single piece of strip metal stock into a series of tubes of definite cross section and respectively definite lengths, comprising tube forming members, in combination with a continuous draft mechanism and measuring and cut-off mechanism, arranged in alinement in the order named and simultaneously operative upon said stock, substantially as described.

42. A continuous mill adapted to convert a single piece of strip metal stock into a series of pieces of definite cross section and respectively definite lengths, comprising progressive bending members, in combination with a continuous draft mechanism and measuring and cut-off mechanism, arranged in alinement in the order named and simultaneously operative upon the stock, substantially as described.

43. A continuous mill adapted to convert a single piece of tubular metal stock into a series of welded tubes of definite cross section and respectively definite lengths, comprising, in combination with a welder, a deburring device, a reducer, a continuous draft mechanism and measuring and cut-off mechanism, arranged in alinement in the order named and simultaneously operative upon the stock, substantially as described.

44. A continuous mill adapted to convert a single piece of tubular metal stock into a series of tubes of definite cross section and respectively definite lengths, comprising a drawing die in combination with a continuous draft mechanism and measuring and cut-off mechanism arranged in alinement in the order named and simultaneously operative upon the stock, substantially as described.

45. A continuous mill adapted to convert substantially continuous strip metal stock into welded tubes of definite cross section and respectively definite lengths, comprising forming members in combination with a welder, a deburrer, a reducer, a draft mechanism adapted to continuously draw the stock through said members, welder, deburrer and reducer in the order named, a measuring mechanism, a cut-off device and means controlled by said measuring mechanism and causing said cut-off device to move with and sever successive end portions of the stock at intervals and in lengths determined by said measuring mechanism.

46. A continuous mill adapted to convert substantially continuous strip metal stock into welded tubes of definite cross section and respectively definite lengths, comprising forming members in combination with a welder, a reducer, a draft mechanism adapted to continuously draw the stock through said members, welder and reducer in the order named, a measuring mechanism, a cut-off device, and means controlled by said measuring mechanism and causing said cut-off device to move with and sever successive end portions of the stock at intervals and in lengths determined by said measuring mechanism.

47. A continuous mill adapted to convert substantially continuous strip metal stock into welded tubes of definite cross section and respectively definite lengths, comprising forming members in combination with a welder, a draft mechanism adapted to continuously draw the stock through said members and welder, in the order named, a measuring mechanism, a cut-off device and means controlled by said measuring mechanism and causing said cut-off device to move with and sever successive end portions of the stock at intervals and in lengths determined by said measuring mechanism.

48. A continuous mill adapted to convert substantially continuous strip metal stock into tubes of definite cross section and respectively definite lengths, comprising forming dies in combination with a tube reducing die, a draft mechanism adapted to continuously draw the stock through said dies, in the order named, a measuring mechanism, a cut-off device and means controlled by said measuring mechanism and causing said cut-off device to move with and sever successive end portions of the stock at intervals and in lengths determined by said measuring mechanism.

49. A continuous mill adapted to convert substantially continuous strip metal into pieces of definite cross section and respectively definite lengths, comprising a drawing die mechanism in combination with a reducing die mechanism, a draft mechanism adapted to continuously draw the stock through said mechanisms in the order named, a measuring mechanism, a cut-off device and means controlled by said measuring mechanism and causing said cut-off device to move with and sever successive end portions of the stock at intervals and in lengths determined by said measuring mechanism.

50. A continuous mill adapted to convert substantially continuous strip metal stock into tubes of definite cross section and respectively definite lengths, comprising a tube drawing die mechanism in combination with a draft mechanism adapted to continuously draw the stock through said mechanism, a measuring mechanism, a cut-off device and means controlled by said measuring mechanism and causing said cut-off device to move with and sever successive end portions of the stock at intervals and in lengths determined by said measuring mechanism.

51. A continuous mill adapted to convert substantially continuous strip metal stock into cross sectionally bent pieces of definite cross section and respectively definite lengths, comprising a drawing die mechanism in combination with a draft mechanism adapted to continuously draw the stock through said mechanism, a measuring mechanism, a cut-off device and means controlled by said measuring mechanism and causing said cut-off device to move with and sever successive end portions of the stock at intervals and in lengths determined by said measuring mechanism.

52. A continuous mill adapted to convert substantially continuous tubular metal stock into welded tubes of definite cross section and respectively definite lengths, comprising a welder, in combination with a deburring device, a tube reducing die, a draft mechanism adapted to continuously draw the stock through said welder, device and die in the order named, a measuring mechanism, a cut-off device and means controlled by said measuring mechanism and causing said cut-off device to move with and sever successive end portions of the stock at intervals and in lengths determined by said measuring mechanism.

53. A continuous mill adapted to convert substantially continuous tubular metal stock into tubes of definite cross section and respectively definite lengths, comprising a drawing die mechanism, in combination with a draft mechanism adapted to continuously draw the stock through said mechanism, a measuring mechanism, a cut-off device and means controlled by said measuring mechanism and causing said cut-off device to move with and sever successive end portions of the stock at intervals and in lengths determined by said measuring mechanism.

54. A continuous mill adapted to convert substantially continuous tubular metal stock into tubes of respectively definite lengths, comprising a holding mechanism for positioning the stock, in combination with means for moving the stock, in combination with means for moving the stock through said holding means, a measuring mechanism, a cut-off device and means controlled by said measuring mechanism and causing said cut-off device to move with and sever successive end portions of the stock at intervals and in lengths determined by said measuring mechanism.

55. A continuous tube mill adapted to convert substantially continuous strip metal stock into tubes of respectively definite lengths, comprising tube drawing dies, in combination with a mechanism adapted to measure and cut the tubing while the same is in motion and a draft mechanism interposed between and in operative alinement with the forming and cut-off mechanism and adapted to continuously draw the stock through the forming mechanism and continuously propel the resultant tubing through the cut-off mechanism, substantially as described.

56. A continuous mill adapted to convert substantially continuous strip metal stock into welded tubes of definite cross section and respectively definite lengths, comprising a former, in combination with a welder, a deburrer, a reducer, a one direction draft mechanism formed to circumferentially fit, grasp and continuously draw the stock through said former, welder, deburrer and reducer in the order named, and a measuring and cut-off mechanism in operative alinement with said draft mechanism and adapted to cut off successive lengths of tubing as they emerge therefrom.

57. A continuous mill adapted to convert substantially continuous strip metal stock into welded tubes of definite cross section and respectively definite lengths, comprising a former, in combination with a welder, a reducer, a one direction draft mechanism formed to circumferentially fit, grasp and continuously draw the stock through said former, welder and reducer in the order named, and a measuring and cut-off mechanism in operative alinement with said draft mechanism and adapted to cut off successive lengths of tubing as they emerge therefrom.

58. A continuous mill adapted to convert substantially continuous strip metal stock into welded tubes of definite cross section and respectively definite lengths, comprising a former, in combination with a welder, a one direction draft mechanism formed to circumferentially fit, grasp and continuously draw the stock through said former and welder, in the order named, and a measuring and cut-off mechanism in operative alinement with said draft mechanism and adapted to cut off successive lengths of tubing as they emerge therefrom.

59. A continuous mill adapted to convert substantially continuous strip metal stock into welded tubes of definite cross section and respectively definite lengths, comprising forming dies, in combination with a tube reducing die mechanism, a one direction draft mechanism formed to circumferentially fit, grasp and continuously draw the stick through said dies, in the order named, and a measuring and cut-off mechanism in operative alinement with said draft mechanism and adapted to cut off successive lengths of tubing as they emerge therefrom.

60. A continuous mill adapted to convert substantially continuous strip metal stock into pieces of definite cross section and respectively definite lengths, comprising a drawing die mechanism, in combination with a reducing die mechanism, a one direction draft mechanism formed to circumferentially fit, grasp and continuously draw the stock through said mechanisms in the order named, and a measuring and cut-off mechanism in operative alinement with said draft mechanism and adapted to cut off successive lengths of stock as they emerge therefrom.

61. A continuous mill adapted to convert substantially continuous strip metal stock into tubes of definite cross section and respectively definite lengths, comprising a tube drawing die mechanism, in combination with a one direction draft mechanism formed to circumferentially fit, grasp and continuously draw the stock through said mechanism, and a measuring and cut-off mechanism in operative alinement with said draft mechanism and adapted to cut off successive lengths of tubing as they emerge therefrom.

62. A continuous mill adapted to convert substantially continuous strip metal stock into cross sectionally bent pieces of definite cross section and respectively definite lengths, comprising a drawing die mechanism, in combination with a one direction draft mechanism formed to circumferentially fit, grasp and continuously draw the stock through said mechanism, and a measuring and cut-off mechanism in operative alinement with said draft mechanism and adapted to cut off successive lengths of stock as they emerge therefrom.

63. A continuous mill adapted to convert substantially continuous tubular metal stock into welded tubes of definite cross section and respectively definite lengths, comprising welder, in combination with a deburring device, a tube reducing die, a one direction draft mechanism formed to circumferentially fit, grasp and continuously draw the stock through said welder, device and die in the order named, and a measuring and cut-off mechanism in operative alinement with said draft mechanism and adapted to cut off successive lengths of tubing as they emerge therefrom.

64. A continuous mill adapted to convert substantially continuous tubular metal stock into tubes of definite cross section and respectively definite lengths, comprising a drawing die mechanism, in combination with a one direction draft mechanism formed to circumferentially fit, grasp and continuously draw the stock through said mechanism, and a measuring and cut-off mechanism in operative alinement with said draft mechanism and adapted to cut off successive lengths of tubing as they emerge therefrom.

65. A continuous mill adapted to convert metal stock, such as tubing, into pieces of respectively definite length, comprising a holding and guiding device in combination with a continuous one direction draft mechanism formed to circumferentially fit, grasp and continuously propel the stock forward in straight line non-distorted condition, a measuring mechanism, a cut-off device and means controlled by said measuring mechanism and causing said cut-off device to move with and sever successive end portions of the stock at intervals and in lengths determined by said measuring mechanism.

66. A continuous tube mill adapted to convert substantially continuous strip metal stock into welded tubes, comprising forming dies adapted to progressively shape the stock into tubing having a longitudinal seam, in combination with a seam positioner which causes the seam of the tubing to conform to a straight line, means operatively alined with said dies for holding the tubing at one point against lateral movement in any direction and formed to expose the seam edges of the tubing at that point, a seam welder for welding such exposed seam edges, a continuous one direction draft mechanism in operative alinement with said dies and holding means and adapted to continuously draw stock therethrough, said draft mechanism being formed to constantly exert circumferentially uniform tension upon the tubing, and cut-off mechanism adapted to cut the welded tubing into lengths as it emerges from said draft mechanism, without interrupting the movement thereof.

67. A continuous tube mill adapted to convert substantially continuous strip metal stock into welded tubes, comprising forming dies adapted to progressively shape the stock into tubing having a longitudinal seam, in combination with a seam positioner, means operatively alined therewith for holding the tubing at one point against lateral movement in any direction and formed to expose the seam edges of the tubing at that point, a seam welding device positioned to deliver a welding heat upon said edges at said point, a continuous draft mechanism in operative alinement with said dies and holding means and adapted to continuously draw stock therethrough, and measuring and cut-off mechanism adapted to cut the welded tubing into lengths as it emerges from said draft mechanism, without interrupting the movement thereof.

68. A continuous tube mill adapted to convert substantially continuous strip metal stock into welded tubes, comprising forming dies adapted to progressively shape the stock into tubing having a longitudinal seam, in combination with means for holding the tubing at one point against lateral movement in any direction and formed to there expose and press together the seam edges of the tubing and chill the circumferential remainder thereof, means for welding the edges thus exposed as the tubing moves through the holding means, a continuous one direction draft mechanism adapted to draw the stock through said dies and holding means, and a cut-off mechanism adapted to cut the tubing into lengths as it emerges from the draft mechanism, substantially as described.

69. A continuous tube mill adapted to convert substantially continuous strip metal stock into welded tubes, comprising tube forming and seam positioning means adapted to progressively shape the stock into tubing having a straight longitudinal seam, in combination with means for holding the tubing against lateral movement in any direction and formed to expose the seam edges of the tubing and chill the circumferential remainder thereof, a seam welding device positioned to fuse said exposed edges of the tubing, and a one direction continuous draft mechanism in operative alinement with said forming and holding means and adapted to draw the stock therethrough.

70. A continuous tube mill adapted to convert substantially continuous strip metal stock into welded tubes comprising forming dies and seam positioning means adapted to progressively shape the stock into initial tubing having a straight longitudinal seam, in combination with means for holding the tubing at one point against lateral movement in any direction and formed to expose and press together the seam edges of the tubing and to cool the circumferential remainder thereof at that point, seam welding means located at that point, tube shaping means for reducing the tubing from initial cross section to a final cross section, a continuous elongated draft mechanism in operative alinement with said dies, holding means and shaping means and adapted to draw the stock therethrough, said draft mechanism being formed to exert circumferentially uniform tension upon the tubing, measuring means, a cut-off mechanism, means controlled by said measuring means and causing said cut-off mechanism to move with and sever successive resultant portions of tubing at intervals determined by said measuring means.

71. A continuous tube mill adapted to convert substantially continuous strip metal stock into welded tubes, comprising forming dies and seam positioning means adapted to progressively shape the stock into tubing having a straight longitudinal seam, in combination with welding means in operative alinement with said dies for welding said seam, a continuous draft mechanism in operative alinement with said dies and welding means and adapted to draw the stock therethrough, and a cut-off mechanism for automatically severing successive end portions of the tubing as it emerges from said draft mechanism.

72. A continuous tube mill adapted to convert substantially continuous strip metal stock into welded tubes, comprising forming dies and seam positioning means adapted to progressively shape the stock into tubing having a straight longitudinal seam, in combination with welding means in operative alinement with said dies for welding said seam, and continuous draft mechanism in operative alinement with said dies and means, and adapted to draw the stock therethrough.

73. A continuous tube mill adapted to convert substantially continuous strip metal stock into welded tubes, comprising forming dies and seam positioning means adapted to progressively shape the stock into initial tubing having a straight longitudinal seam, in combination with seam welding means in operative alinement with said dies, another die also in alinement therewith for reducing the tubing from initial cross section to a final cross section, a continuous-one direction draft mechanism in operative alinement with said dies and adapted to draw the stock therethrough, said draft mechanism being formed to circumferentially and progressively grasp the tubing, and a cut-off mechanism adapted to automatically cut the tubing into lengths, substantially as described.

74. A continuous tube mill adapted to convert substantially continuous strip metal stock into welded tubes, comprising tube forming and seam positioning means adapted to progressively shape the stock into tubing having a straight longitudinal seam, in combination with tube holding means for at one point holding the tubing against lateral movement in any direction and formed to expose and press together the seam edges of the tubing and chill the circumferential remainder thereof, seam welding means operable upon the seam edges in said holding means, mechanism for moving the stock longitudinally through said means, and a cut-off mechanism adapted to cut off successive end portions of tubing as the same emerge from said draft mechanism, and without interrupting the movement thereof.

75. A continuous tube mill adapted to convert substantially continuous strip metal stock into welded tubes, comprising a tube forming and seam positioning mechanism adapted to progressively shape the stock into initial tubing having a straight longitudinal seam, in combination with holders for holding the tubing at one point against lateral movement in any direction and formed to expose the seam edges of the tubing and chill the circumferential remainder thereof, a welding device adjustably fixed above said holders and adapted to project its flame upon the seam edges between said holders, a continuous one direction draft mechanism in operative alinement with said dies, and holders, and a cut-off mechanism positioned to receive the tubing from said draft mechanism.

76. A continuous tube mill comprising a tube die, in combination with holders for holding the tubing at one point against lateral movement in any direction and formed to expose and press together the seam edges of the tubing, seam welding means operable between said holders to weld the seam edges there progressively exposed, a continuous draft mechanism in operative alinement with said dies and holders, measuring means and a cut-off mechanism, means controlled by said measuring means and causing said cut-off mechanism to move with the tubing and sever successive end portions thereof at intervals determined by said measuring means as the tubing emerges from said draft mechanism and without interrupting the movement thereof.

77. A continuous tube mill adapted to convert substantially continuous strip metal stock into tubes of specified cross section and respectively specified lengths, comprising tube forming and seam positioning mechanism adapted to progressively shape the stock into tubing having a straight longitudinal seam, in combination with a continuous one direction draft mechanism in operative alinement with said forming mechanism and adapted to exert circumferentially uniform tension upon the tubing to draw the stock through said forming mechanism and a cut-off mechanism adapted to sever successive end portions of the tubing, substantially as described.

78. A continuous tube mill adapted to convert substantially continuous strip metal stock into tubes of specified cross section and respectively specified lengths, comprising tube forming and seam positioning mechanism adapted to progressively shape the stock into tubing having a straight longitudinal seam, in combination with a one direction draft mechanism in operative alinement with said forming mechanism and adapted to draw the stock therethrough, measuring means, a cut off mechanism, means controlled by said measuring means and causing said cut-off to move with the tubing and sever successive end portions thereof at intervals determined by said measuring means as the tubing emerges from said draft mechanism and without interrupting the movement thereof.

79. A continuous tube mill adapted to convert substantially continuous strip metal stock into tubes of specified cross section and respectively specified lengths, comprising tube forming and seam positioning mechanism adapted to progressively shape the stock into initial tubing having a straight longitudinal seam, in combination with means in operative alinement with said mechanism and adapted to reduce the tubing from initial cross section to a final cross section, a one direction draft mechanism in operative alinement with said mechanism and means and adapted to draw the stock therethrough, measuring means, a cut-off mechanism, means controlled by said measuring means and causing said cut-off mechanism to move with the tubing and sever successive end portions thereof at intervals determined by said measuring means as the tubing emerges from said draft mechanism and without interrupting the movement thereof.

80. A continuous tube mill adapted to convert substantially continuous strip metal stock into welded tubes of specified cross section and length, comprising forming dies adapted to progressively shape the stock into initial tubing having a longitudinal seam, in combination with positioning means adapted to expose and press together the seam edges of the tubing at one point in the travel of the tubing, welding means, located at that point, means for reducing the tubing from initial cross section to a final cross section, a continuous draft mechanism adapted to draw the stock through said dies and means, and a cut-off mechanism operable during the movement of the tubing.

81. A continuous tube mill adapted to convert substantially continuous strip metal stock into welded tubes, comprising forming dies adapted to progressively shape the stock into initial tubing having a longitudinal seam, in combination with positioning means adapted to expose and press together the seam edges of the tubing at one point in the travel of the tubing, welding means located at that point, draft mechanism adapted to draw the stock through said dies and means, measuring means, a cut-off mechanism, means controlled by said measuring means and causing said cut-off mechanism to move with the tubing and sever successive end portions thereof at intervals determined by said measuring means as the tubing emerges from said draft mechanism and without interrupting the movement thereof.

82. A continuous tube mill adapted to convert substantially continuous strip metal stock into tubes, comprising forming dies adapted to progressively shape the stock into tubing having a longitudinal seam, a continuous one direction draft mechanism in operative alinement with said dies and adapted to draw the stock therethrough, said draft mechanism being formed to exert circumferentially uniform tension upon the tubing, measuring means, a cut-off mechanism, means controlled by said measuring means and causing said cut-off mechanism to move with the tubing and sever successive end portions thereof at intervals determined by said measuring means as the tubing emerges from said draft mechanism and without interrupting the movement thereof.

83. A continuous tube mill for converting strip metal stock into welded tubes, comprising means for setting and maintaining the stock in motion longitudinally, in combination with mechanism adapted to progressively form the moving stock into tubing having a longitudinal seam, mechanism for progressively holding the seam edges together, welding means co-acting therewith to weld said edges, and mechanism for finally severing and delivering successive end portions of the welded tubing.

84. A continuous mill, comprising forming dies adapted to progressively bend and shape the stock to definite cross section, in combination with a continuous one direction draft mechanism in operative alinement with said dies, measuring means, a cut-off mechanism, means controlled by said measuring means and causing said cut-off mechanism to move with the formed stock and sever successive end portions thereof at intervals determined by said measuring means.

In testimony whereof, I have hereunto set my hand, this 29th day of June, 1911, in the presence of two subscribing witnesses.

MARSHALL B. LLOYD.

Witnesses:
HILDA C. PETERSON,
CHARLES GILBERT HAWLEY.